United States Patent
Spain, Jr. et al.

(10) Patent No.: US 9,088,943 B1
(45) Date of Patent: Jul. 21, 2015

(54) BASE STATION TIMING DERIVED FROM WIRELESS TERMINAL INFORMATION

(71) Applicant: Polaris Wireless, Inc., Mountain View, CA (US)

(72) Inventors: David Stevenson Spain, Jr., Portola Valley, CA (US); Scot Douglas Gordon, Redmond, WA (US)

(73) Assignee: Polaris Wireless, Inc., Mountain View, CA (US)

( * ) Notice: Subject to any disclaimer, the term of this patent is extended or adjusted under 35 U.S.C. 154(b) by 62 days.

(21) Appl. No.: 13/736,288

(22) Filed: Jan. 8, 2013

(51) Int. Cl.
*H04W 24/00* (2009.01)
*H04W 56/00* (2009.01)
*G01S 5/02* (2010.01)

(52) U.S. Cl.
CPC .............. *H04W 56/006* (2013.01); *G01S 5/02* (2013.01)

(58) Field of Classification Search
CPC ..... G01S 5/0205; G01S 5/021; G01S 5/0263; G01S 5/14
See application file for complete search history.

(56) References Cited

U.S. PATENT DOCUMENTS

| | | | |
|---|---|---|---|
| 7,412,248 B2 | 8/2008 | McNew et al. | |
| 7,460,870 B2 * | 12/2008 | Moeglein et al. | 455/456.1 |
| 8,112,096 B2 | 2/2012 | Mazlum et al. | |
| 2008/0318596 A1 | 12/2008 | Tenny | |
| 2009/0131075 A1 * | 5/2009 | Mazlum et al. | 455/456.1 |
| 2009/0286552 A1 * | 11/2009 | Wu | 455/456.2 |
| 2010/0331012 A1 | 12/2010 | Zhang | |
| 2012/0094688 A1 | 4/2012 | Gravely et al. | |
| 2012/0115509 A1 * | 5/2012 | Sheynblat et al. | 455/456.1 |
| 2013/0024155 A1 * | 1/2013 | Le et al. | 702/150 |

OTHER PUBLICATIONS

Joint Distributed Synchronization and Positioning in UWB Ad Hoc Networks using TOA, Benoit et al. Apr. 2006.*
TOA-based distributed localisation with unknown internal delays and clock frequency offsets in wireless sensor networks, Yu et al Jul. 2008.*
"Related U.S. Appl. No. 13/736,278", "Notice of Allowance", Jan. 30, 2015.
"Related U.S. Appl. No: 13/736,278", "NonFinal Office Action", Jul. 7, 2014.

* cited by examiner

*Primary Examiner* — William Nealon
(74) *Attorney, Agent, or Firm* — Kaplan Breyer Schwarz & Ottesen, LLP

(57) ABSTRACT

A technique for deriving timing information across wireless base stations is disclosed. After initializing values for base station time-offset parameters, a server acquires reference coordinates of a wireless terminal, which are provided from an independent source, and also acquires values for one or more time-of-occurrences of events associated with signals that travel between the wireless terminal and the base stations. The server generates predicted coordinates of the wireless terminal, based in part on the current time-offset values, by using trilateration. The server then generates updated time-offset values, based on a method of least squares, in which each residual is a difference between the reference and predicted coordinates of each wireless terminal location, for one or more wireless terminals. The server modifies the time-offset values so as to minimize the least-squares function.

50 Claims, 11 Drawing Sheets

BASE STATION TIMING DERIVED FROM WIRELESS TERMINAL INFORMATION

CROSS REFERENCE TO RELATED APPLICATIONS

This application is related to "Base Station Location Derived From Wireless Terminal Information," application Ser. No. 13/736,278, filed on the same day as the present application and incorporated by reference herein in its entirety.

FIELD OF THE INVENTION

The present invention relates to telecommunications in general, and, more particularly, to a technique for deriving base station timing from information received from a wireless terminal.

BACKGROUND OF THE INVENTION

FIG. 1 depicts a diagram of the salient components of wireless telecommunications system 100 in the prior art. Wireless telecommunications system 100 comprises: base stations 101-1 through 101-3, wireless terminal 102, wireless switching center 111, location client 112, and location server 113, interrelated as shown. Wireless telecommunications 100 provides wireless telecommunications service to all of geographic region 120, in well-known fashion.

Each of base stations 101-1 through 101-3 comprises a clock. The clock enables each event that occurs as part of the base station's operations to be assigned the time at which the event occurs. Examples of such events include, but are not limited to, i) transmission of a particular signal, ii) reception of a particular signal, iii) initiation of a communication session, and iv) termination of a communication session.

In some wireless telecommunications systems in the prior art, each base station synchronizes its clock with an external time reference that is common to all base stations in the system. An example of such an external time reference is one that is based on the Global Positioning System (GPS). In such synchronized systems, when an event occurs at a base station, the time at which it occurs is known relative to the external time reference. As a result, because all base stations synchronize their clocks to the same external reference, it is possible to know the relative timing of events that occur, across the different base stations.

SUMMARY OF THE INVENTION

In wireless telecommunications systems in which base stations are not synchronized to the same time reference, it is difficult to determine when an event has occurred relative to an absolute time reference. Also, because in such systems there is no time reference that is common to all base stations, it is also difficult to determine the relative timing of events that occur across multiple base stations.

In such unsynchronized telecommunications systems, it is difficult to implement services that require knowledge of the timing of events at different base stations, such as position determination services. A position determination service that is based on, for example, a time-difference of arrival (TDOA) technique can be used to locate a wireless terminal by measuring the relative times-of-arrival of signals that are transmitted by the wireless terminal and received at different base stations.

For these services to work, it is necessary to know the time interval that elapses between i) the reception of a signal at one base station and ii) the reception of the same signal at another base station. Without additional equipment being introduced, these services cannot be supported in at least some systems in the prior art in which timing is unknown across the base stations.

The present invention enables the derivation of relative timing information across different base stations in a wireless telecommunications system. In accordance with the illustrative embodiment of the present invention, an attribute server generates one or more values of time offsets, where each time offset represents the attribute of clock timing at each of the different base stations. To do so, the server first initializes the time offset values, which can be, for example, initialized with arbitrary values.

The server then acquires reference coordinates for the location of a wireless terminal, which are provided from an independent, position determination source. The server also acquires values for one or more time-of-occurrences of events associated with signals that travel between the wireless terminal and one or more base stations. The arrival of a signal at a base station from the wireless terminal is one example of such an event.

The server then uses an iterative procedure to generate predicted coordinates for the location of the wireless terminal. The terminal's predicted coordinates differ from the terminal's reference coordinates, in that the predicted coordinates are based on the time-offset values, which might be incorrect. Indeed, if the time offset values are initialized with arbitrary values, the predicted coordinates that are generated in the first iteration, immediately after such initialization, are likely to have large errors. In contrast, the reference coordinates are generated by an independent source, and they are expected to be reasonably accurate.

In order to generate the predicted coordinates—which are distinguished from the reference coordinates, as discussed above—the server utilizes a technique that relies on the time-of-occurrence measurements of a signal from the terminal, whereas the reference coordinates are obtained independently of the same measurements. One such technique is trilateration, which uses, among other parameters, the time-of-occurrence measurements from three or more base stations and the current time-offset values.

The server then generates updated time offset values. In accordance with the illustrative embodiment of the present invention, the server does so by modifying one or more of the time offsets values from the previous iteration. This process of modification is based on the recognition made by the inventors that i) the system of equations used in the trilateration is an overdetermined system and, as such, ii) a numerical solution of such an overdetermined system can be based on a method of least squares, or on a similar method. In the least-squares method used in the illustrative embodiment, a plurality of residuals is computed, wherein each residual is based on a difference between a reference coordinate and the corresponding predicted coordinate of a wireless terminal location, for one or more wireless terminals at one or more locations. One advantage of solving for an overdetermined system in this way is that measurements related to i) a given wireless terminal at multiple locations or ii) multiple wireless terminals (at different locations) are usable, either alone or in combination and in accordance with the illustrative embodiment, in order to achieve an improved, approximate solution of the system.

In generating the updated time offset values, the server modifies the time-offset values so as to optimize the method function that is used to solve the system. In accordance with the illustrative embodiment, the server tries to minimize the least-squares function (i.e., the sum of the residuals) by selecting new time-offset values according to, for example, a method of steepest descent. Alternatively, a different value-selection method can be used.

The server iteratively repeats the aforementioned trilateration and least-squares calculations, until the time-offset values have converged according to a predetermined level of accuracy or some other criterion. The server then makes the time-offset values available to an application, such as to a service that relies on accurately knowing the timing across base stations.

The technique of the illustrative embodiment is advantageous in deriving timing across base stations in unsynchronized systems. Additionally, the technique is advantageous in other situations such as the following. Even in wireless telecommunications systems where the relative timing across the base stations is in fact known, the timing of one base station clock might be known only to a certain degree of accuracy in relation to a common time reference or to the timing of another base station. Such a degree of accuracy might be sufficient for certain functionalities, but not for others. For example, the TDOA technique relies on the speed at which radio signals propagate; at this speed, a timing error of one microsecond corresponds to around 300 meters. In this example, if accuracy greater than 300 meters is required for a position determination service relying on TDOA, then this accuracy requirement is more stringent than what the error allows. The technique of the illustrative embodiment is able to address an imperfect knowledge of timing across base stations, such as that described in the foregoing example, and in doing so improves the timing accuracy. In such a situation, the server can initialize the time-offset values with the available imperfect values, instead of arbitrary values.

In accordance with the illustrative embodiment, the attribute server uses one or more signals that are transmitted by one or more wireless terminals and are received by one or more base stations. Although the attribute server is depicted as using signals that are transmitted by wireless terminals, it will be clear to those skilled in the art, after reading this specification, how to make and use embodiments of the present invention in which the reverse is true—that is, the attribute server uses one or more signals that are transmitted by one or more base stations and are received by one or more wireless terminals.

An illustrative embodiment of the present invention comprises: receiving, by a data processing system: (1) a first reference coordinate, $\hat{x}_1$, that represents a reference location of a wireless terminal, and (2) a time of occurrence of an event associated with a signal traveling between the wireless terminal and a first base station; generating, by the data processing system, a first predicted coordinate, $\tilde{x}_1$, that represents a predicted location of the wireless terminal, based on: (1) the location of the first base station, (2) the time of occurrence, and (3) a first value of a time offset at the first base station, $\tau_{11}$, wherein the time offset characterizes timing at the first base station; and generating, by the data processing system, a second value of the time offset, $\tau_{21}$, based on modifying first value $\tau_{11}$ dependent upon a function of a first expression that comprises $\hat{x}_1$ and $\tilde{x}_1$.

DETAILED DESCRIPTION

Figure 1:
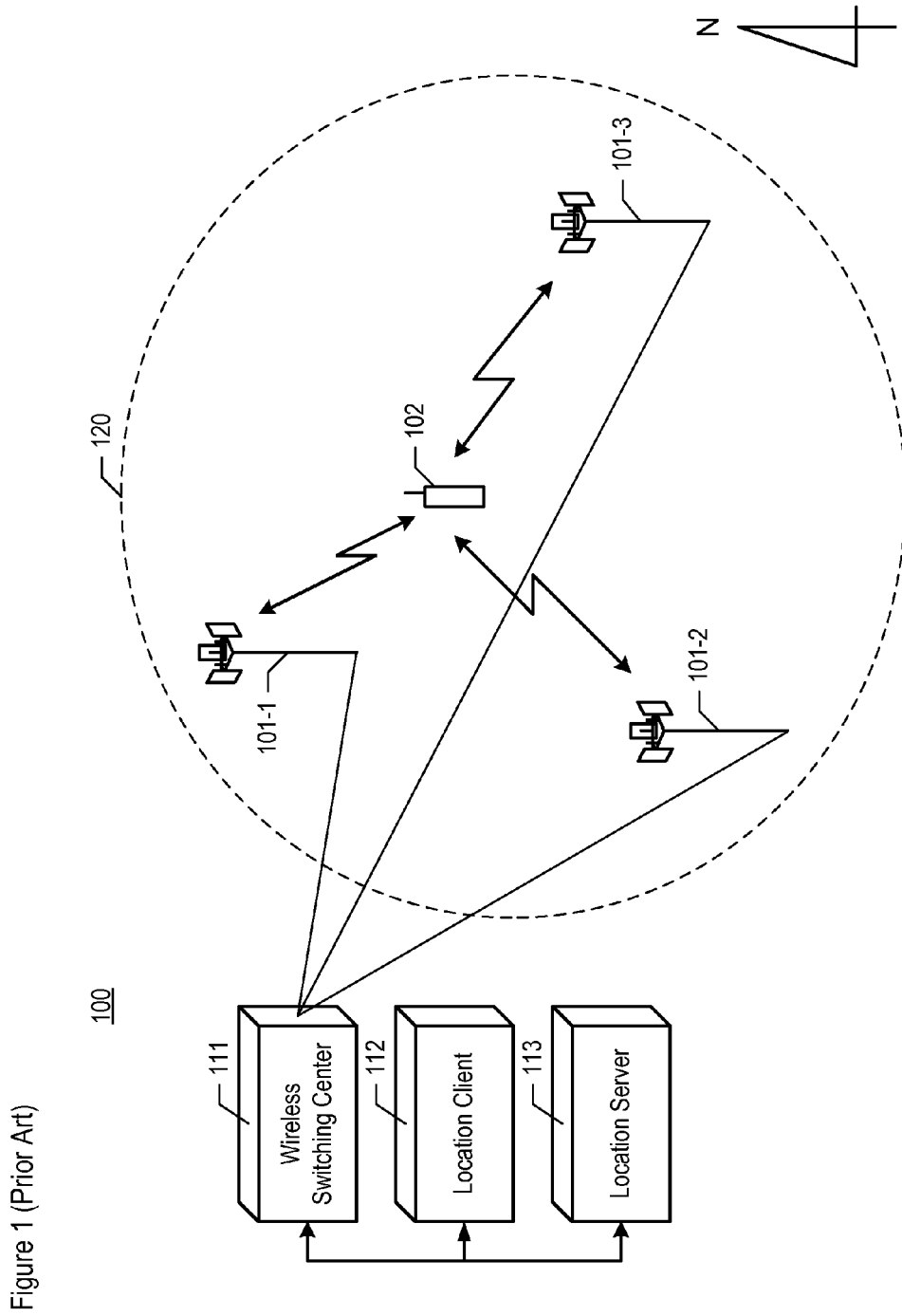
FIG. 1 depicts a diagram of the salient components of wireless telecommunications system 100 in the prior art.

For the purposes of this specification, the following terms and their inflected forms are defined as follows:

The term "location" is defined as a zero-dimensional point, a finite one-dimensional path segment, a finite two-dimensional surface area, or a finite three-dimensional volume.

The term "wireless terminal" is defined as a wireless telecommunications terminal that is capable of transmitting and/or receiving communications wirelessly. As is well known to those skilled in the art, a wireless terminal is also commonly referred to by a variety of alternative names such as a wireless transmit/receive unit (WTRU), a user equipment (UE), a mobile station, a fixed or mobile subscriber unit, a pager, a cellular telephone, a personal digital assistant (PDA), a computer, or any other type of device capable of operating in a wireless environment.

The term "coordinate" is defined as a representation of a location consisting of a numerical value. A single location may be represented by one or more coordinate values. Coordinates are defined within a coordinate system, also referred to in the art as a coordinate frame. The coordinate frame on which a coordinate is based can be, for example and without limitation, i) Cartesian, ii) Polar, iii) cylindrical, iv) spherical, v) geodetic, vi) homogeneous, vii) based on latitude and longitude, or viii) representative of a location with respect to one or more geographic features or landmarks (e.g., cities, bodies of water, highways, monuments, buildings, bridges, other structures, etc.). Although the symbol "x" is used in the illustrative embodiment to represent a single, Cartesian coordinate, x is to be interpreted within the scope of the claims as referring to a coordinate that may be from any coordinate system, Cartesian or otherwise.

The term "time of occurrence" is defined as the time at which an event occurs, wherein the event is associated with a signal traveling between a wireless terminal and a base station. The event can be, for example and without limitation, i) arrival of the signal at the base station from the wireless terminal, ii) transmission of the signal by the base station to the wireless terminal, iii) arrival of the signal at the wireless terminal from the base station, or iv) transmission of the signal by the wireless terminal to the base station. A "time of occurrence" might be absolute, meaning that it is based on a universal clock reference such as, for example, Coordinated Universal Time (UTC) or GPS time, also referred to as "true" time; or it might be relative to a specific clock reference such as a local clock reference.

The term "clock" is defined as a device that provides a time reference. In particular, when an event occurs independently of a clock, the time of occurrence of the event can be obtained by consulting the clock. Conversely, in order to make an event occur at a specified time, a clock can be used to trigger the occurrence of the event at the specified time. A clock might be accurate or inaccurate: an accurate clock provides a time reference with a well-defined relationship to an independent time reference such as, for example, UTC or GPS time. A clock is deemed inaccurate when such a relationship is not known at all, or is known with a degree of accuracy that is deemed insufficient. A clock might be referred to as somewhat accurate or somewhat inaccurate when such relationship is known only to some extent; for example, it might be known subject to a statistical error or within a certain error range. A clock's accuracy might be expressed relative to an absolute standard such as UTC or GPS time, or it might be expressed relative to another clock. The relationship between two clocks is most often represented by a time offset. A time offset might be constant, if the two clocks are stable, or it might change with time. For example, if one clock is running at a faster rate than the other clock, the time offset between the two clocks will not be constant. Time standards such as UTC are often maintained by a collection of coordinated physical clocks. The term "clock" is defined herein as comprising such collections, such that UTC, for example, will be referred to as a clock.

The term "calendrical time T" is defined as the time as denominated in one or more measures (e.g., seconds, minutes, hours, time of day, day, day of week, month, month of year, year, etc.). Calendrical time must be defined relative to a clock, which might be a local, possibly inaccurate clock, or a standard clock such as UTC.

Figure 2:
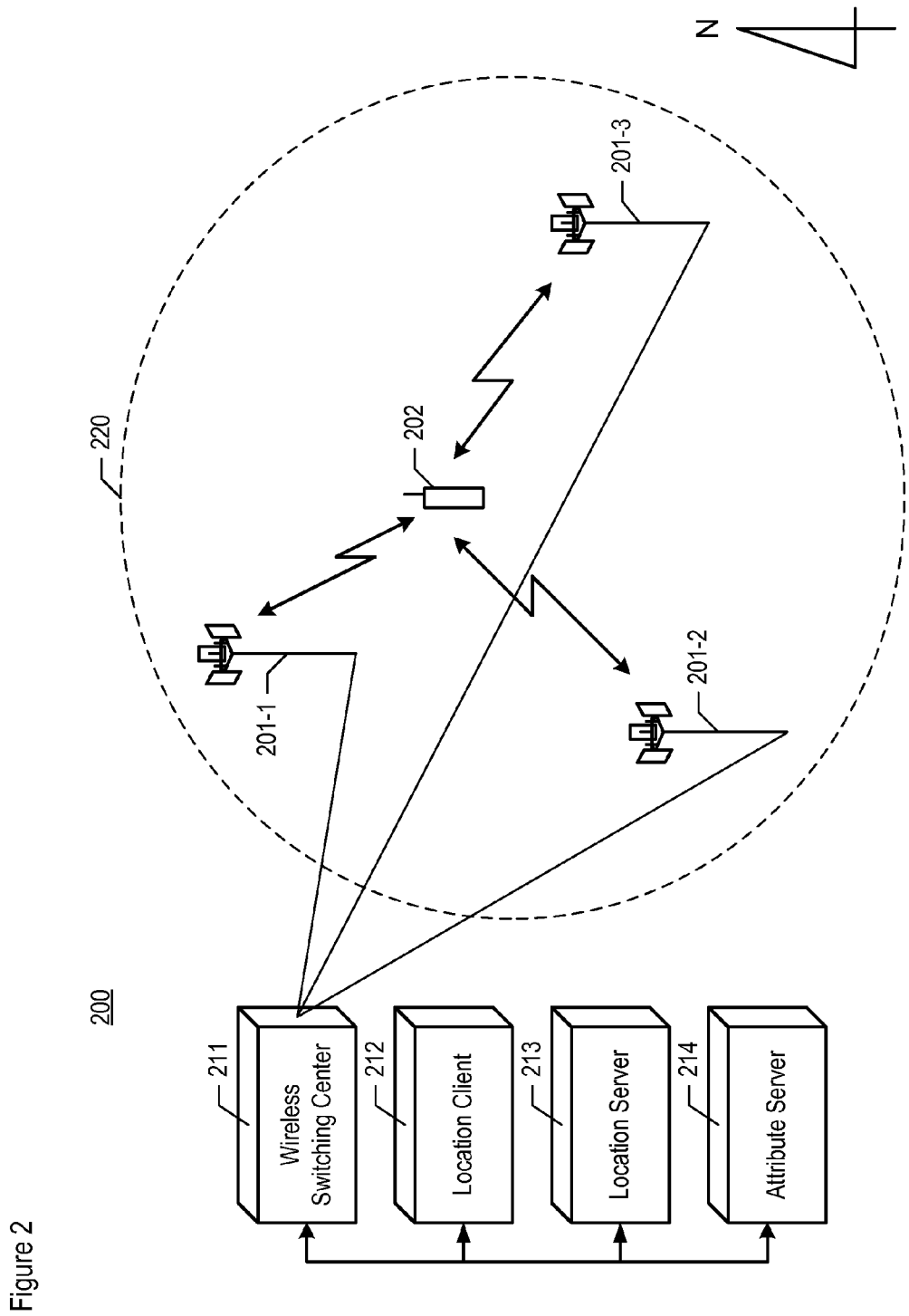
FIG. 2 depicts a diagram of the salient components of wireless telecommunications system 200, in accordance with the illustrative embodiment of the present invention.

Overview—FIG. 2 depicts a diagram of the salient components of wireless telecommunications system 200 in accordance with the illustrative embodiment of the present invention. Wireless telecommunications system 200 comprises: base stations 201-1, 201-2, and 201-3, wireless terminal 202, wireless switching center 211, location client 212, location server 213, and attribute server 214, which are interrelated as shown. The illustrative embodiment provides wireless telecommunications service to all of geographic region 220, in well-known fashion, estimates the location of wireless terminal 202 within geographic region 220, uses that estimate in a location-based application, and determines values for one or more base station attributes or wireless terminal attributes, or both.

In accordance with the illustrative embodiment, wireless telecommunications service is provided to wireless terminal 202 in accordance with the GSM air-interface standard. After reading this disclosure, however, it will be clear to those skilled in the art how to make and use alternative embodiments of the present invention that operate in accordance with one or more other air-interface standards (e.g., Universal Mobile Telecommunications System "UMTS", Long Term Evolution "LTE," CDMA-2000, IS-136 TDMA, IS-95 CDMA, 3G Wideband CDMA, IEEE 802.11 WiFi, 802.16 WiMax, Bluetooth, etc.) in one or more frequency bands.

Base stations 201-1, 201-2, and 201-3 communicate with wireless terminal 202 via radio and with wireless switching center 211, in well-known fashion. In accordance with the illustrative embodiment, each of base stations 201-1, 201-2, and 201-3 has one or more infrastructure antennas that are collocated with the base station (e.g., proximate to the base station electronics, etc.).

Each of base station 201-1, 201-2, and 201-3 has its own free-running clock that provides a representation of the time of day (TOD) or of calendrical time in general. As the clocks are not necessarily synchronized with a "true" time reference such as, for example, Global Positioning System (GPS) time, each clock is characterized by a fixed time offset, relative to true time, wherein each time offset characterizes timing at the corresponding base station.

The individual time offsets of the clocks at base stations 201-1 through 201-3 are denoted by $\tau_i$, with i=1, . . . , N, wherein N is a positive integer that denotes the number of base stations (e.g., N equals 3 in telecommunications system 200, etc.). Achieving mutual time synchronization across a pair of base stations (e.g., stations 201-1 and 201-2, etc.) can be viewed as determining an accurate value for the difference between the time offsets of the two base stations in the pair. In particular, achieving mutual synchronization between a base station, i, and another base station, j, can mean, for example, learning the value of as $\tau_i - \tau_j$ to a desired level of accuracy. Once the value of $\tau_i - \tau_j$ is known, it is possible to adjust the clock of one of the two base stations to make the value of $\tau_i - \tau_j$ equal to zero. With or without the adjusting of one or both of the clocks, ascertaining the value of the difference between the offsets, $\tau_i - \tau_j$, is what is understood as "synchronizing" the two base-station clocks.

Although the illustrative embodiment comprises the depicted configuration of base stations, it will be clear to those skilled in the art, after reading this disclosure, how to make and use alternative embodiments of the present invention that comprise different configurations of base stations. For example and without limitation, alternative embodiments of the present invention can comprise:
  (i) one or more distributed antennas, or
  (ii) one or more repeaters, or
  (iii) one or more base stations in which each base station interoperates with both a distributed antenna system and one or more repeaters, or
  (iv) a different distribution topology from that depicted, or
  (v) a different overall coverage area from that depicted, or
  (vi) any combination of i, ii, iii, iv, and v.

As is well known to those skilled in the art, base stations are also commonly referred to by a variety of alternative names such as access points, nodes (e.g., Node-B, eNode-B, etc.), network interfaces, etc. Moreover, although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, the base stations are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Wireless terminal 202 comprises the hardware and software necessary to be GSM-compliant and to perform the processes described below and in the accompanying figures. For example and without limitation, wireless terminal 202 is capable of:

i. measuring one or more location-dependent traits (e.g., signal strength, propagation delay comprising a timing advance component, etc.) of one of more electromagnetic signals and of reporting the measurements to location server 213, and ii. transmitting one or more signals and of reporting the transmission parameters of the signals to location server 213.

Wireless terminal 202 is mobile and can be at any location within geographic region 220. Although wireless telecommunications system 200 as depicted in FIG. 2 comprises only one wireless terminal, it will be clear to those skilled in the art, after reading this disclosure, how to make and use alternative embodiments of the present invention that comprise any number of wireless terminals.

Wireless switching center 211 comprises a switch that orchestrates the provisioning of telecommunications service to wireless terminal 202 and the flow of information to and from location server 213 and attribute server 214, as described below and in the accompanying figures. As is well known to those skilled in the art, wireless switching centers are also commonly referred to by other names such as mobility management entities (MME), mobile switching centers (MSC), mobile telephone switching offices (MTSO), routers, etc. Furthermore, in some embodiments of the present invention, equipment other than wireless switching center 211 (e.g., a base station controller, a radio network controller, etc.) orchestrates the flow of information to and from servers 213 and 214.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. The use of two or more wireless switching centers is common, for example, when the geographic area serviced by the wireless switching center is small (e.g., local area networks, etc.) or when multiple wireless switching centers serve a common area.

In accordance with the illustrative embodiment, all of the base stations servicing wireless terminal 202 are associated with wireless switching center 211. It will be clear to those skilled in the art, after reading this disclosure, how to make and use alternative embodiments of the present invention in which any number of base stations are associated with any number of wireless switching centers.

Location client 212 comprises hardware and software that use the estimate of the location of wireless terminal 202— provided by location server 213—in a location-based application.

Location server 213 comprises hardware and software that generate one or more estimates of the location of wireless terminal 202, without relying on accurate synchronization across base stations 201-1 through 201-3. Location server 213 might rely on inaccurate synchronization across base stations, if such inaccurate synchronization is available. Location server 213 also comprises hardware and software that provide those location estimates to attribute server 214, which uses one or more of those estimates as reference coordinates of a location of terminal 202. The details of how to make and use location server 213 according to a technique not necessarily requiring accurate synchronization across the base stations are described in U.S. Pat. No. 7,257,414, which is incorporated herein by reference.

Location server 213 provides to attribute server 214 location estimates that are generated according to a particular location estimation technique. It will be clear, however, to those skilled in the art, after reading this disclosure, how to make and use alternative embodiments of the present invention in which location estimates are generated and exchanged in a different manner than described herein. For example and without limitations, wireless terminal 202 might be located through:

(i) a GPS-based technique, or
(ii) an assisted-GPS-based technique, or
(iii) a radio-frequency (RF) fingerprinting technique, or
(iv) measurements of base-station signal-strengths, or
(v) measurements of WiFi hotspot signal-strengths, or
(vi) other techniques that do not rely on synchronization across base stations, or
(vii) a combination of i, ii, iii, iv, v, or vi.

Although location server 213 is depicted in FIG. 2 as being physically distinct from wireless switching center 211, it will be clear to those skilled in the art, after reading this disclosure, how to make and use alternative embodiments of the present invention in which location server 213 is wholly or partially integrated with wireless switching center 211.

In accordance with the illustrative embodiment, location server 213 communicates with wireless switching center 211 and location client 212 via a local area network; however it will be clear to those skilled in the art, after reading this disclosure, how to make and use alternative embodiments of the present invention in which location server 213 communicates with one or more of these entities via a different network such as, for example, the Internet, the Public Switched Telephone Network (PSTN), etc.

Attribute server 214 comprises hardware and software that generate values for one or more attributes of base stations 201-1, 201-2, and 201-3, or of wireless terminal 202, or both, as described below and in the accompanying figures. For example and without limitation, such attributes include i) base station time offsets, wireless terminal time offsets and, iii) coordinates of base station locations. It will be clear to those skilled in the art, after reading this disclosure, how to make and use attribute server 214. Furthermore, although attribute server 214 is depicted in FIG. 2 as physically distinct from wireless switching center 211 and location server 213, it will be clear to those skilled in the art, after reading this disclosure, how to make and use alternative embodiments of the present invention in which attribute server 214 is wholly or partially integrated with wireless switching center 211 or location server 213, or both.

In accordance with the illustrative embodiment, attribute server 214 communicates with wireless switching center 211 and location server 213 via a local area network; however it will be clear to those skilled in the art, after reading this disclosure, how to make and use alternative embodiments of the present invention in which attribute server 214 communicates with one or more of these entities via a different network such as, for example, the Internet, the Public Switched Telephone Network (PSTN), etc.

In accordance with the illustrative embodiment, wireless switching center 211, location client 212, location server 213, and attribute server 214 are outside of geographic region 220. It will be clear to those skilled in the art, after reading this disclosure, how to make and use alternative embodiments of the present invention in which some or all of wireless switching center 211, location client 212, location server 213, and attribute server 214 are instead within geographic region 220.

Figure 3:
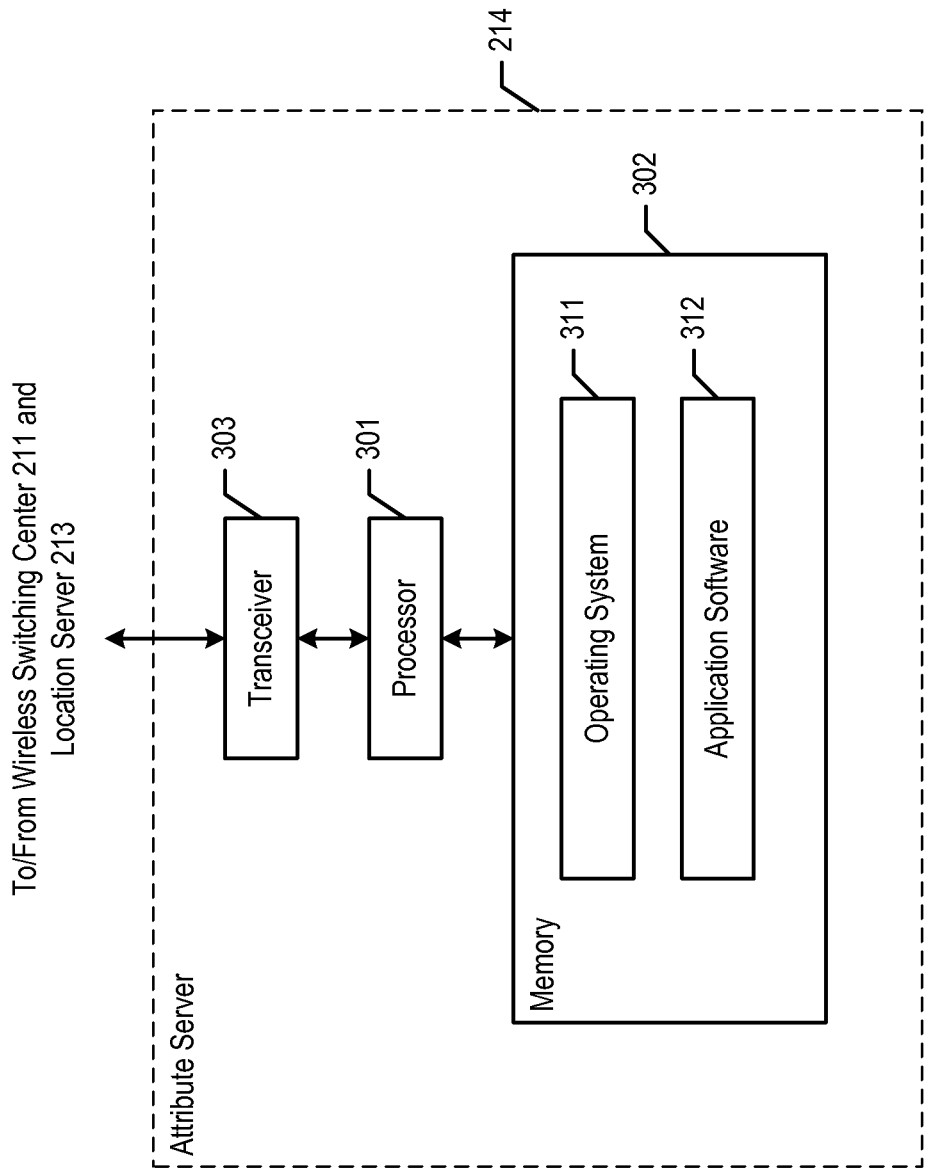
FIG. 3 depicts a block diagram of the salient components of attribute server 214, in accordance with the illustrative embodiment of the present invention.

Attribute Server 214—FIG. 3 depicts a block diagram of the salient components of attribute server 214 in accordance with the illustrative embodiment of the present invention. Attribute server 214 comprises: processor 301, memory 302, and local-area network transceiver 303, which are interconnected as shown.

Processor 301 is a general-purpose processor that is capable of executing operating system 311 and application software 312, as described in detail below and in the accompanying figures. It will be clear to those skilled in the art how to make and use processor 301.

Memory 302 is a non-volatile memory that stores:
  i. operating system 311, and
  ii. application software 312.
It will be clear to those skilled in the art how to make and use memory 302.

Transceiver 303 enables attribute server 214 to transmit information to and receive information from wireless switching center 211 and location server 213. In addition, transceiver 303 enables attribute server 214 to transmit information to and receive information from wireless terminal 202 and base stations 202-1, 202-2, and 202-3 via wireless switching center 211, or via other equipment (e.g., a base station controller, a radio network controller, etc.) in some alternative embodiments of the present invention. It will be clear to those skilled in the art how to make and use transceiver 303.

Figure 4:
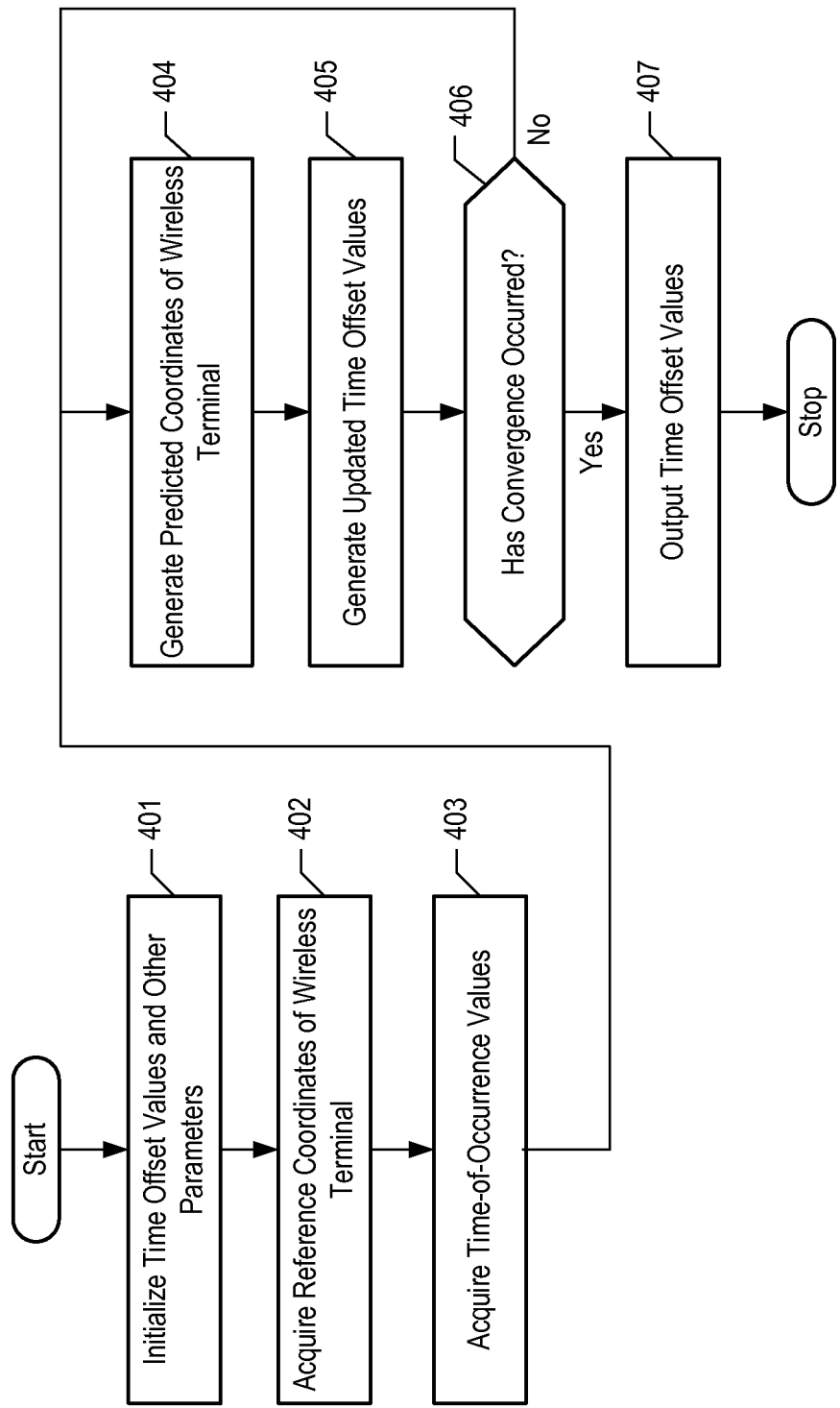
FIG. 4 depicts a flowchart of the salient processes performed in accordance with the illustrative embodiment of the present invention, in order to calculate one or more time offset values.

Operation of the Illustrative Embodiment—Calculation of Time Offset Values. FIG. 4 depicts a flowchart of the salient processes performed in accordance with the illustrative embodiment of the present invention, in order to calculate one or more time-offset values.

The processes performed by attribute server 214 are depicted in the drawings (i.e., FIG. 4 and subsequent figures, also FIG. 11) in a particular order. As those who are skilled in the art will appreciate, after reading this disclosure, such operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

In accordance with the illustrative embodiment of the present invention, attribute server 214 performs the processes depicted in FIG. 4, in order to generate one or more values of time offsets that correspond to base stations 201-1 through 201-3. For pedagogical purposes, server 214 is depicted as using one or more signals that are transmitted by wireless terminal 202 and are received by one or more of base stations 201-1 through 201-3. The time of occurrence of an event that is associated with such a signal transmitted by wireless terminal 202, is based on a measurement made at a receiving base station of the arrival time of the signal, in well-known fashion, wherein the occurring event in the illustrative embodiment is the arrival of the signal.

Although server 214 is depicted as using signals that are transmitted by wireless terminal 202, it will be clear to those skilled in the art, after reading this specification, how to make and use embodiments of the present invention in which the reverse is true—that is, server 214 uses one or more signals that are transmitted by one or more of base stations 201-1 through 201-3 and are received by wireless terminal 202. In such embodiments, the time of occurrence of an event that is associated with such a signal transmitted by one or more base stations is based on a measurement made at the transmitting base station of the transmission time of the signal, in well-known fashion, wherein the event is the transmission of the signal. Furthermore, it will be clear to those skilled in the art, after reading this specification, how to make and use embodiments of the present invention in which server 214 uses a combination of signals transmitted by wireless terminal 202 and signals transmitted by one or more of base stations 201-1 through 201-3.

In accordance with process 401, attribute server 214 initializes time offset values and other parameters. The details of initializing the parameters are described below and in FIG. 5.

In accordance with process 402, attribute server 214 acquires reference coordinates of wireless terminal 202. The details of acquiring the reference coordinates are described below and in FIG. 6.

In accordance with process 403, attribute server 214 acquires values for one or more time-of-occurrences of events (e.g., arrival of signal, etc.) associated with signals that travel between wireless terminal 202 and one or more of base stations 201-1 through 202-3. The details of acquiring the time-of-occurrence values are described below and in FIG. 7.

In accordance with process 404, attribute server 214 generates predicted coordinates of wireless terminal 202. The details of generating the predicted coordinates are described below and in FIG. 8.

In accordance with process 405, attribute server 214 generates updated time offset values, resulting in $\tau_{j,i}$ at iteration j for base station 201-$i$. Server 214 achieves this by modifying one or more time offsets at the previous iteration, $\tau_{(j-1),i}$. The details of generating the updated values are described below and in FIG. 9.

In accordance with process 406, attribute server 214 determines whether the updated time offset values have converged, in well-known fashion. If convergence has not occurred, server 214 proceeds to repeat the aforementioned processes starting with process 404. If convergence has occurred, server 214 proceeds to process 407.

In accordance with process 407, attribute server 214 outputs the time offset values, to be used in an application, such as and without limitation, an application to adjust one or more base station clocks. Attribute server 214 transmits the estimate to the particular application.

It will be clear to those skilled in the art, after reading this specification, how to make and use embodiments of the present invention in which attribute server repeats some or all of processes 401 through 407. For example, after server 214 determines one set of time offset values, the server might return to process 401 in order to consider different base stations, or different wireless terminals, or different locations of one or more wireless terminals, alone or in any combination.

Figure 5:
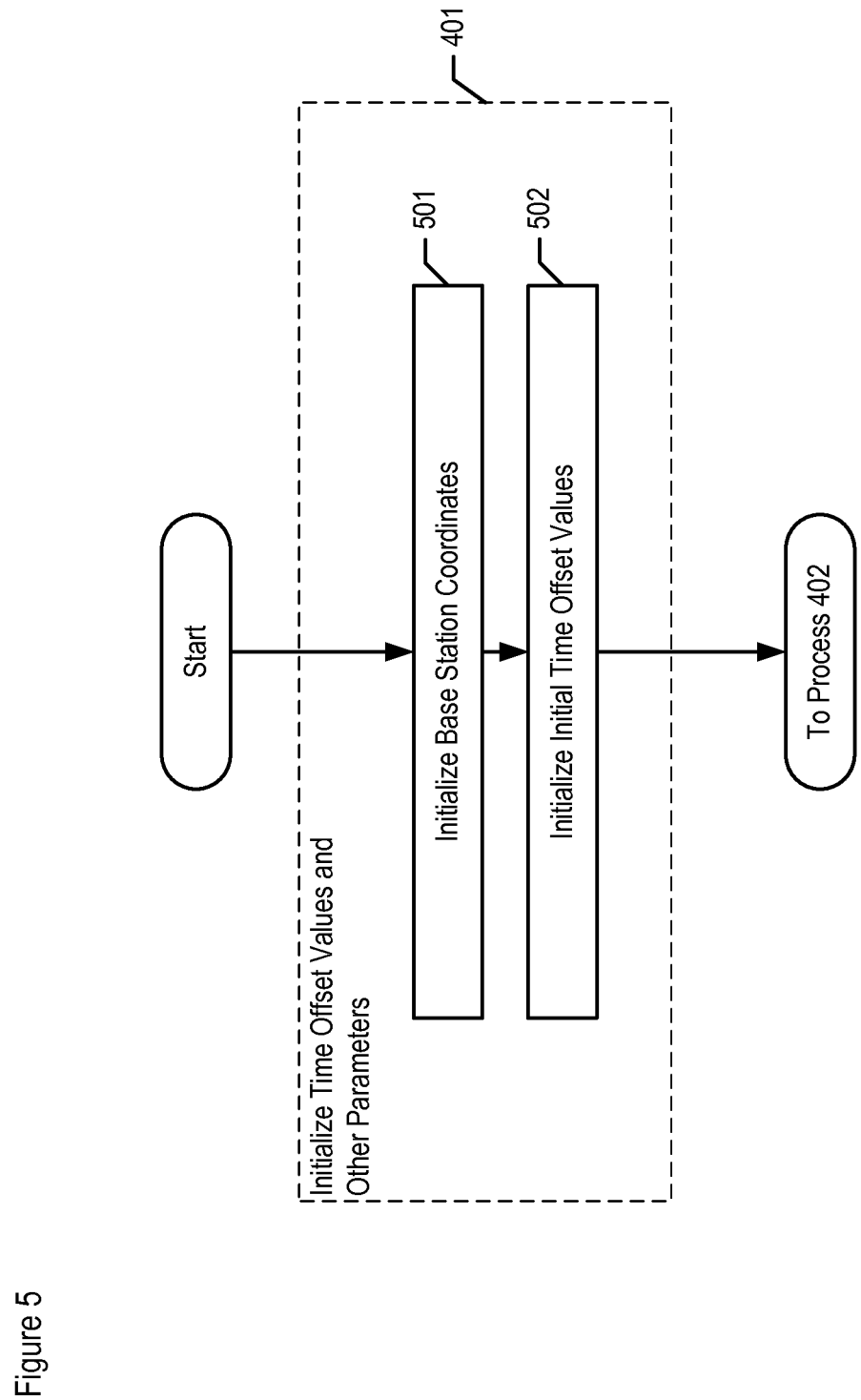
FIG. 5 depicts a flowchart of the salient processes performed in order to initialize time offset values and other parameters.

Initialize Time Offset Values and Other Parameters—FIG. 5 depicts a flowchart of the salient processes performed in accordance with process 401—initializing time offset values and other parameters.

In accordance with process 501, attribute server 214 initializes the coordinates for the locations of base stations 201-1 through 201-3. Server 214 queries location server 213 for the locations of the base stations and stores the coordinates. In some alternative embodiment of the present invention, server 214 queries and acquires the coordinates from another source, such as wireless switching center 211. In some other alternative embodiments, a technician might input the coordinates of the base station locations directly into attribute server 214.

The locations of base stations 201-1 through 201-3 are denoted by Cartesian coordinate pairs, wherein the coordinate pair $(x_{Bi}, y_{Bi})$ denotes Cartesian coordinates for base station 201-$i$, with $i=1, \ldots, N$, wherein N is a positive integer and equal to three in the illustrative embodiment. As those who are skilled in the art will appreciate after reading this specification, local Cartesian coordinates, referenced to a locally-defined origin, can be used as an acceptable approximation of spherical coordinates such as latitude and longitude, for both the wireless terminal coordinates and base station coordinates. In particular, such coordinates are a reasonable approximation for the relatively short distances associated with wireless terminal 202 and base stations 201-1 through 201-3, in relation to the curvature of the Earth. It will be clear, however, to those skilled in the art, after reading this disclosure, how to make and use alternative embodiments of the present invention that do not utilize such an approximation and that, instead, use latitude and longitude where necessary instead of Cartesian coordinates. Moreover, it is well known in the art how to convert latitude and longitude into local Cartesian coordinates, and vice versa.

In accordance with the illustrative embodiment, the locations of base stations 201-1 through 201-3 are expressed in terms of two spatial dimensions. It will be clear, however, to those skilled in the art, after reading this specification, how to make and use embodiments of the present invention in which the locations of base stations 201-1 through 201-3 are expressed in terms of a different number of spatial dimensions (e.g., one, three, etc.).

In accordance with process 502, attribute server 214 initializes values for the time offsets of base stations 201-1 through 201-3. In accordance with the illustrative embodiment of the present invention, server 214 picks a set of initial values for the N unknown clock offsets of the base stations, $\tau_1, \ldots, \tau_N$. As those who are skilled in the art will appreciate after reading this specification, the initial values can be chosen arbitrarily, or at random, or by using a different technique such as one that is based on trilateration, as discussed below and with respect to FIG. 8 and equation sets (1) and (2). In some embodiments, approximate values for $\tau_1, \ldots, \tau_N$ might be available; in those embodiments, such approximate values might be used advantageously as initial values.

Figure 6:
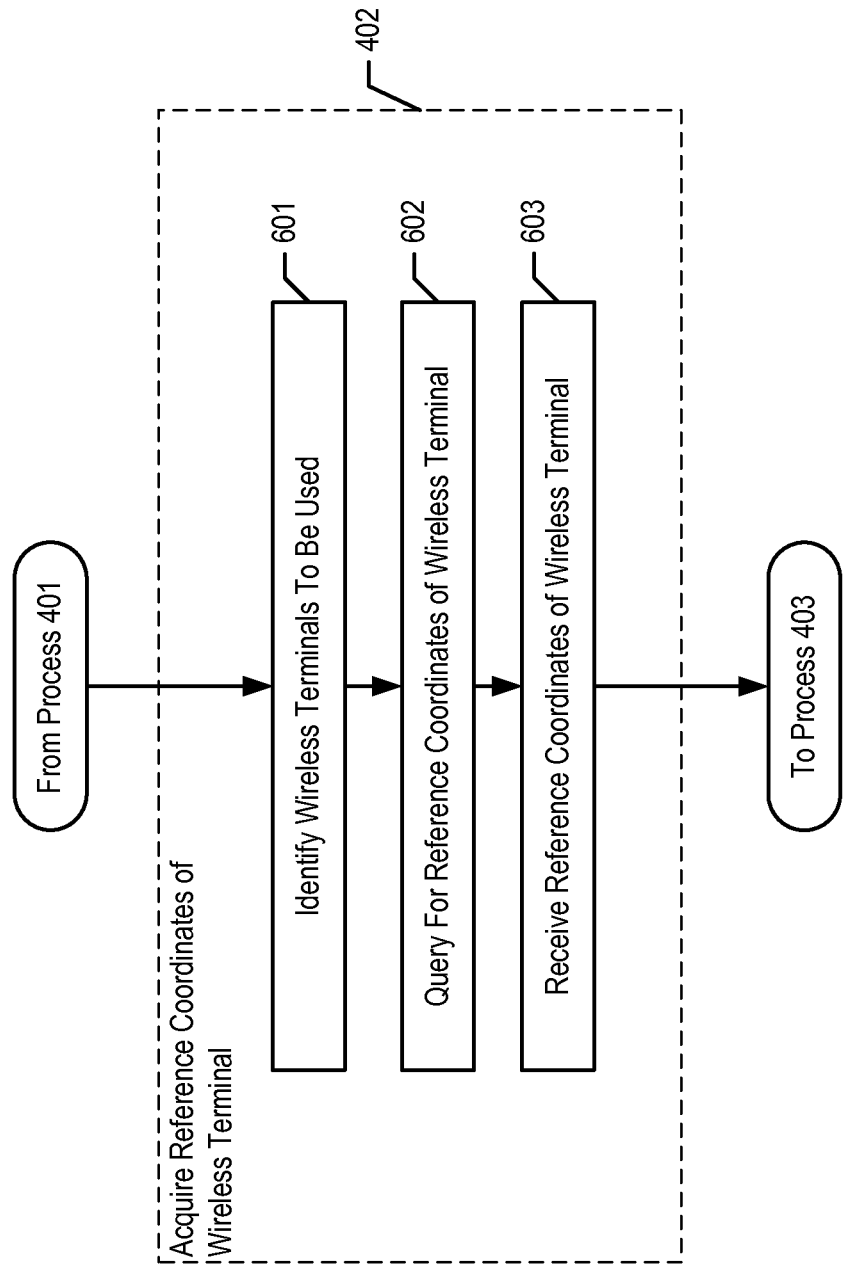
FIG. 6 depicts a flowchart of the salient processes performed in order to acquire the reference coordinates of wireless terminal 202.

Acquire Reference Coordinates of Wireless Terminal 202—FIG. 6 depicts a flowchart of the salient processes performed in accordance with process 402—acquiring the reference coordinates of wireless terminal 202.

In accordance with process 601, in order to determine the signals to be used, attribute server 214 identifies one or more wireless terminals capable of transmitting signals that one or more of base stations 201-1 through 201-3 are able to receive. Attribute server 214 identifies wireless terminal 202, which is currently located as depicted in FIG. 2 where it is capable of transmitting signals that one or more of the base stations are able to receive.

Figure 10:
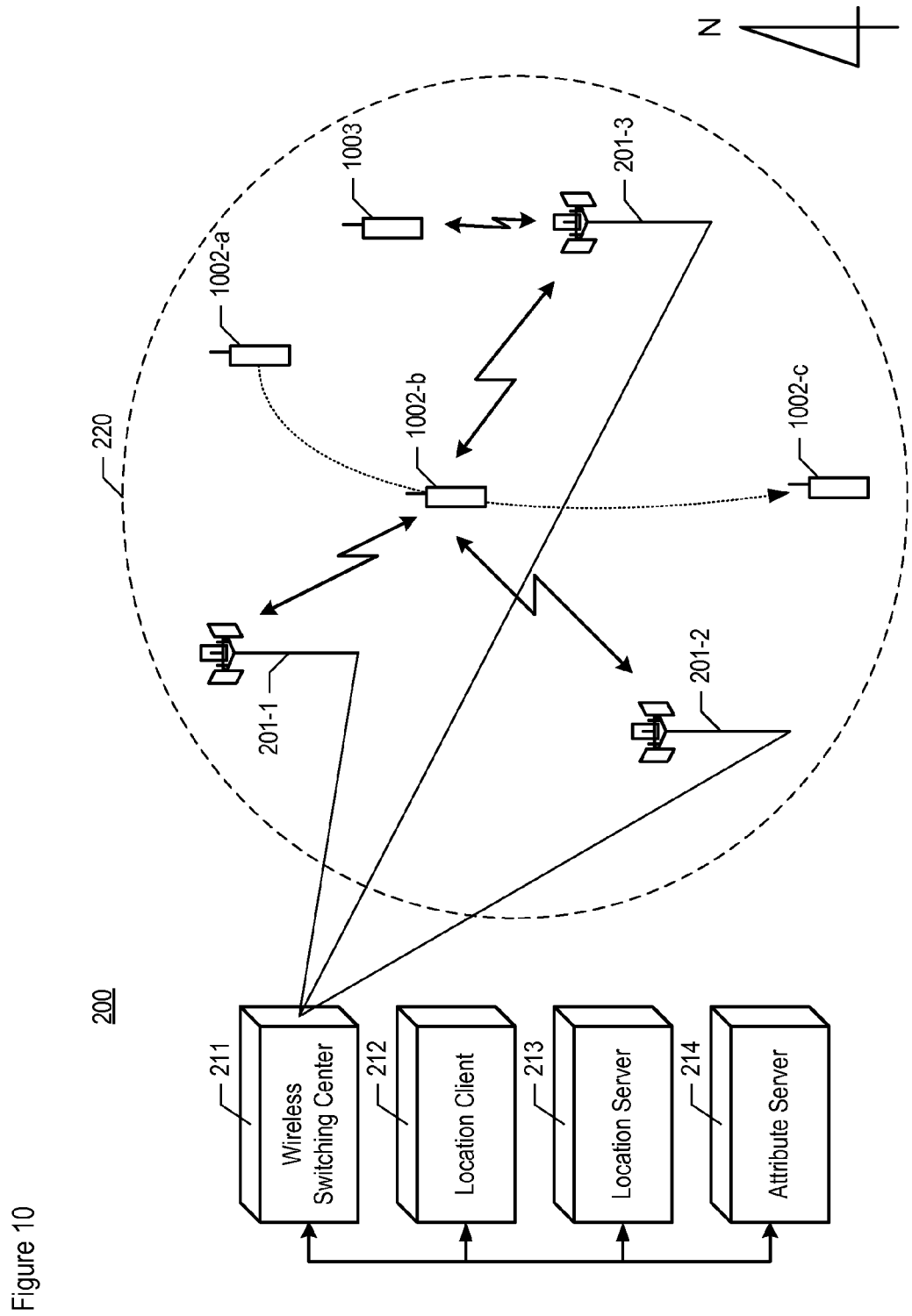
FIG. 10 depicts a diagram of the salient components of wireless telecommunications system 200 with multiple wireless terminals.

Although server 214 has identified a single wireless terminal at a single location (i.e., terminal 202), it will be clear to those skilled in the art, after reading this specification, how to make and use embodiments of the present invention in which server 214 uses signals from multiple wireless terminals or signals transmitted from multiple locations of a given wireless terminal, or both. For example, FIG. 10 depicts a scenario in which server 214 has identified two wireless terminals, terminals 1002 and 1003, each of which as depicted is capable of transmitting a signal that at least one of base stations 201-1 through 201-3 is capable of receiving. Furthermore, wireless terminal 1002 is depicted as moving through geographic region 220, wherein server 214 uses the signals transmitted by terminal 1002 at three locations, depicted progressively over time as "1002-$a$", "1002-$b$", and "1002-$c$".

In regard to the signals received from the identified wireless terminals, for the purposes of this disclosure the multiple signals are individually identified with subscript M, the total number of signals is denoted by $N_S$, and the times of transmission of the signals by the identified wireless terminals are denoted by $t_{0M}$, and $M=1, \ldots, N_S$. For example and referring to FIG. 10, $t_{01}$ can represent the time of transmission of a signal from wireless terminal 1002 at location "a", $t_{02}$ can represent the time of transmission of a signal from terminal 1002 at location "b", $t_{03}$ can represent the time of transmission of a signal from terminal 1002 at location "c", and $t_{04}$ can represent the time of transmission of a signal from terminal 1003 at its depicted location. As those who are skilled in the art will appreciate, after reading this specification, $t_{0M}$ can be made to represent a time of transmission of a signal from any wireless terminal at any location, in any combination.

In accordance with process 602, attribute server 214 queries location server 213 for the reference coordinates of identified wireless terminal 202 at one or more locations.

In accordance with process 603, attribute server 214 receives the reference coordinates for one or more locations of wireless terminal 202, wherein the reference coordinates to be used by server 214 correspond to the location from where terminal 202 transmitted the signals referred to in process 601. For the purposes of this disclosure, the reference coordinates of the locations of wireless terminal 202, are denoted by $(\hat{x}_M, \hat{y}_M)$, with $M=1, \ldots, N_S$. Although server 214 receives the reference coordinates in response to the query made at process 602, it will be clear to those skilled in the art, after reading this specification, how to make and use embodiments in which attribute server 214 receives the reference coordinates in a different manner.

In accordance with the illustrative embodiment, the reference coordinates are expressed in terms of two spatial dimensions. It will be clear, however, to those skilled in the art, after reading this specification, how to make and use embodiments of the present invention in which the reference coordinates—and/or the predicted coordinates, for that matter—are expressed in terms of a different number of spatial dimensions (e.g., one, three, etc.).

In some embodiments of the present invention, one or more reference coordinates are determined by location server 213 independently of any timing-related trait of any signal traveling between wireless terminal 202 and base stations 201-1 through 201-3. Examples of timing-related traits include, but are not limited to, propagation delay, timing advance, round-trip time, arrival time, transmission time, and so on.

Figure 7:
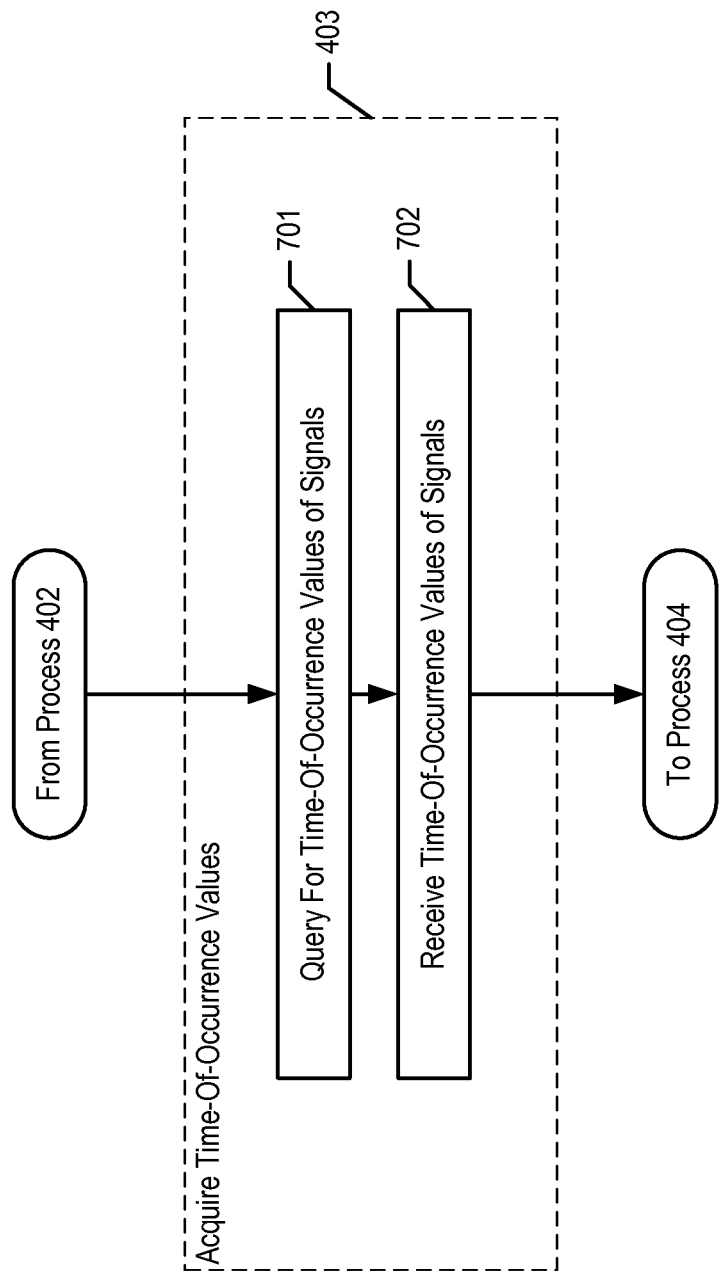
FIG. 7 depicts a flowchart of the salient processes performed in order to acquire values for the times of occurrence of one or more signals.

Acquire Time-Of-Occurrence Values—FIG. 7 depicts a flowchart of the salient processes performed in accordance with process 403—acquiring values for the times of occurrence of one or more signals that travel between wireless terminal 202 and one or more of base stations 201-1 through 201-3.

In accordance with process 701, attribute server 214 queries base stations 201-1 through 201-3 for the time of occurrence of an event associated with each signal transmitted by wireless terminal 202, as described in process 601. As described earlier, in the illustrative embodiment the time of occurrence corresponds to a measurement of the arrival time of the signal at a base station, as wireless terminal 202 is transmitting the signal being used instead of base stations 201-1 through 201-3 transmitting the signal. Ideally, the time of occurrence measurement is of an event (e.g., arrival time, etc.) that is coincident in time with the information that is used to obtain the reference coordinates of wireless terminal 202. In some embodiments, however, the time of occurrence measurement is made and/or used without considering coincidence in time.

In accordance with the illustrative embodiment, server 214 acquires the time-of-occurrence values from base stations 201-1 through 201-3. It will be clear, however, to those skilled in the art, after reading this specification, how to make and use embodiments of the present invention in which server 214 acquires the time-of-occurrence values from a different source, such as wireless switching center 211 or location server 213.

In accordance with the illustrative embodiment, base stations 201-1 through 201-3 provide their time-of-occurrence measurements to attribute server 214 via wireless switching center 211 and in response to the query from attribute server 214 to do so. It will be clear to those skilled in the art, however, after reading this disclosure, how to make and use alternative embodiments of the present invention in which base stations 201-1 through 201-3 provide their time-of-occurrence measurements to attribute server 214 periodically, sporadically, in the absence of a query, or in response to some other event.

In accordance with process 702, attribute server 214 receives the time-of-occurrence values that correspond to the signal transmitted between wireless terminal 202 and base stations 201-1 through 201-3, wherein each signal might or might not be received by all base stations. For the purposes of this disclosure, the times of occurrences are denoted by $t_{iM}$, with i=1, ..., N and M=1, ..., $N_S$.

Figure 8:
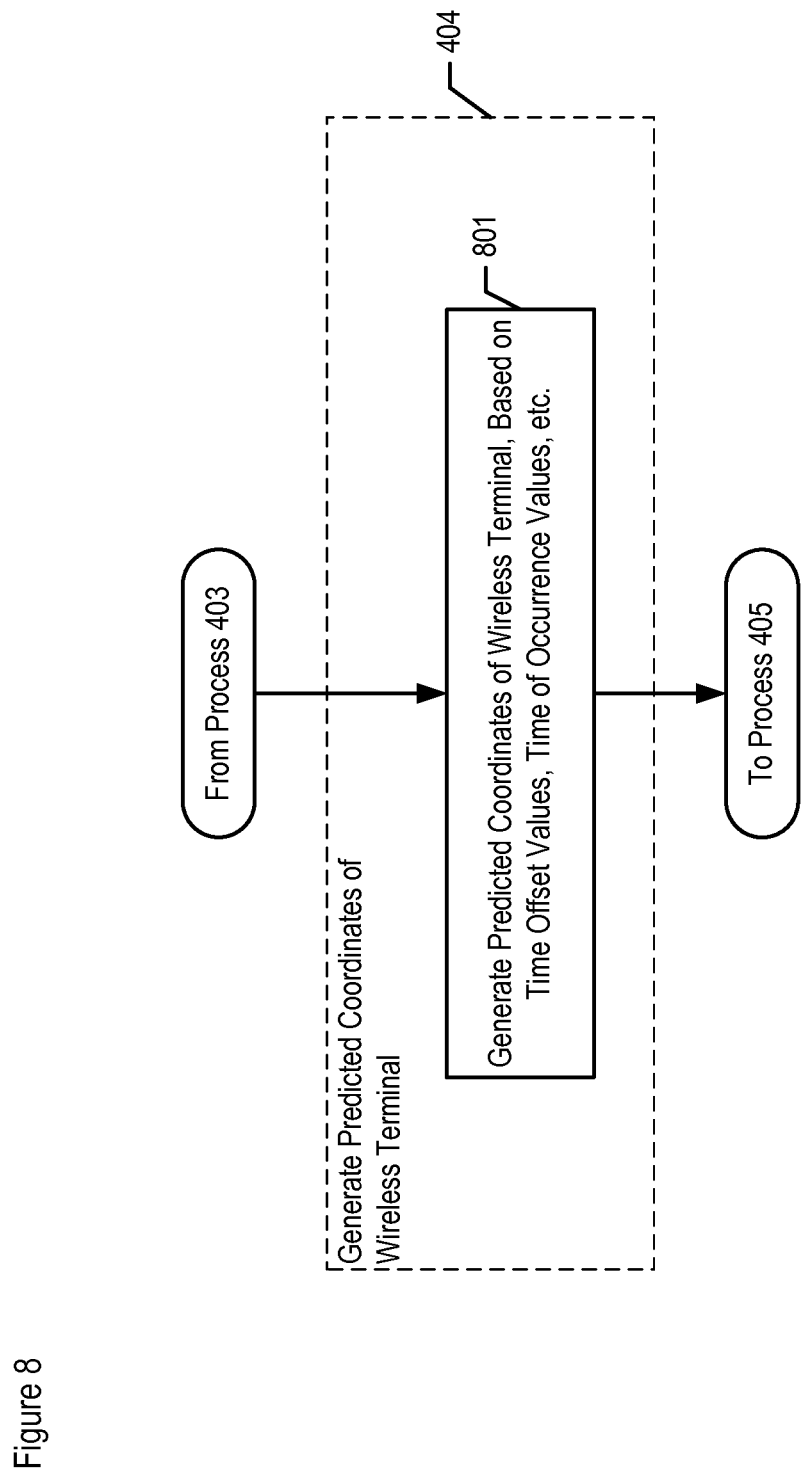
FIG. 8 depicts a flowchart of the salient processes performed in order to generate the predicted coordinates of wireless terminal 202.

Generate Predicted Coordinates of Wireless Terminal 202—FIG. 8 depicts a flowchart of the salient processes performed in accordance with process 404—generating the predicted coordinates of wireless terminal 202.

In accordance with process 801, attribute server 214 generates the predicted coordinates of wireless terminal 202, by using a location method known in the art as "trilateration."

In general, according to the trilateration method, three estimated propagation delays of a signal traveling between a wireless terminal and three base stations, $\hat{d}_{1M}$ through $\hat{d}_{3M}$, can be calculated using the following equations:

$$\begin{cases} \hat{d}_{1M} = \sqrt{(\hat{x}_M - x_{B1})^2 + (\hat{y}_M - y_{B1})^2} \Big/ c \\ \hat{d}_{2M} = \sqrt{(\hat{x}_M - x_{B2})^2 + (\hat{y}_M - y_{B2})^2} \Big/ c \\ \hat{d}_{3M} = \sqrt{(\hat{x}_M - x_{B3})^2 + (\hat{y}_M - y_{B3})^2} \Big/ c \end{cases} \quad (1)$$

wherein c is the speed of light, which is also the speed of propagation of radio signals over the air; $(\hat{x}_M, \hat{y}_M)$ are the reference coordinates of the location of the terminal; and $(x_{Bi}, y_{Bi})$ are the coordinates of the actual location of the $i^{th}$ base station, with i=1 to 3.

The calculations performed by attribute server 214 are based on the following relationship:

$$\begin{cases} t_{1M} = t_{0M} + d_{1M} + \tau_1 \\ t_{2M} = t_{0M} + d_{2M} + \tau_2 \\ t_{3M} = t_{0M} + d_{3M} + \tau_3 \end{cases} \quad (2)$$

wherein the time of transmission of the signal transmitted by wireless terminal 202 is denoted by $t_{0M}$, and $d_{1M}, d_{2M}$, and $d_{3M}$ denote the actual propagation delays of the transmitted signal between wireless terminal 202 and base stations 201-1, 201-2, and 201-3, respectively, as opposed to the estimated propagation delays in equation set (1) above. These three relationships are derived from the fact that each base station records a time of arrival equal to the time of transmission, $t_{0M}$, delayed by the propagation delay for that base station 201-$i$, $d_{iM}$, and offset by the unknown time offset of the clock at base station 201-$i$, $\tau_i$, with i=1, 2, or 3 in the illustrative embodiment. The reference clocks for the times appearing in equation set (2) are as follows: $t_{1M}$ is with respect to the clock of base station 1, $t_{2M}$ is with respect to the clock of base station 2, and $t_{3M}$ is with respect to the clock of base station 3; $t_{0M}$ is with respect to an absolute time reference. Correspondingly, the three timing offsets $\tau_1$, $\tau_2$, and $\tau_3$ are each between the local clock of the associated base station and an absolute time reference. It will be clear to those skilled in the art, after reading this specification, that the value of $t_{0M}$ cancels out in the calculations, and that, even though absolute time is used as reference, the illustrative embodiment does not require access to an absolute time reference. In particular, this is so because, as already noted, the objective of the present invention is to generate values of pairwise differences of $\tau_1$, $\tau_2$, and $\tau_3$ such the time reference cancels out.

Trilateration performed in accordance with process 801 uses the relationships in equation set (2), wherein server 214 uses the current time-of-occurrence values as the known values for $\tau_1$, $\tau_2$, and $\tau_3$, and wherein the coordinates of wireless terminal 202, $x_M$ and $y_M$, that are the unknown variables to be solved for. In particular, $d_{1M}$, $d_{2M}$, and $d_{3M}$ are expressed in terms of $x_M$ and $y_M$ as:

$$\begin{cases} d_{1M} = \sqrt{(x_M - x_{B1})^2 + (y_M - y_{B1})^2} \Big/ c \\ d_{2M} = \sqrt{(x_M - x_{B2})^2 + (y_M - y_{B2})^2} \Big/ c \\ d_{3M} = \sqrt{(x_M - x_{B3})^2 + (y_M - y_{B3})^2} \Big/ c \end{cases} \quad (3)$$

The desired equations are obtained by substituting equation set (3) into (2). The three resulting equations are then solved, in well-known fashion, to obtain unique values for the unknown coordinates of wireless terminal 202, $x_M$ and $y_M$, in terms of $\tau_1$-$\tau_2$, $\tau_1$-$\tau_3$, and $\tau_2$-$\tau_3$ and $x_{B1}$, $y_{B1}$, $x_{B2}$, $y_{B2}$, $x_{B3}$, and $y_{B3}$. The solved-for values of coordinates $x_M$ and $y_M$ are denoted by $\hat{x}_M$ and $\hat{y}_M$ and are then used as the predicted coordinates of wireless terminal 202.

In accordance with the illustrative embodiment, attribute server 214 generates predicted coordinates for wireless terminal 202 based on three base stations being used—namely, base stations 201-1 through 201-3. It will be clear, however, to those skilled in the art, after reading this specification, how to make and use embodiments of the present invention using trilateration when the number of base stations, N, is greater than 3 and, therefore, the number of equations is also greater than 3. In such embodiments, the equations cannot always be solved exactly, but it is well known in the art how to obtain a solution that makes optimal use of the available information.

Figure 9:
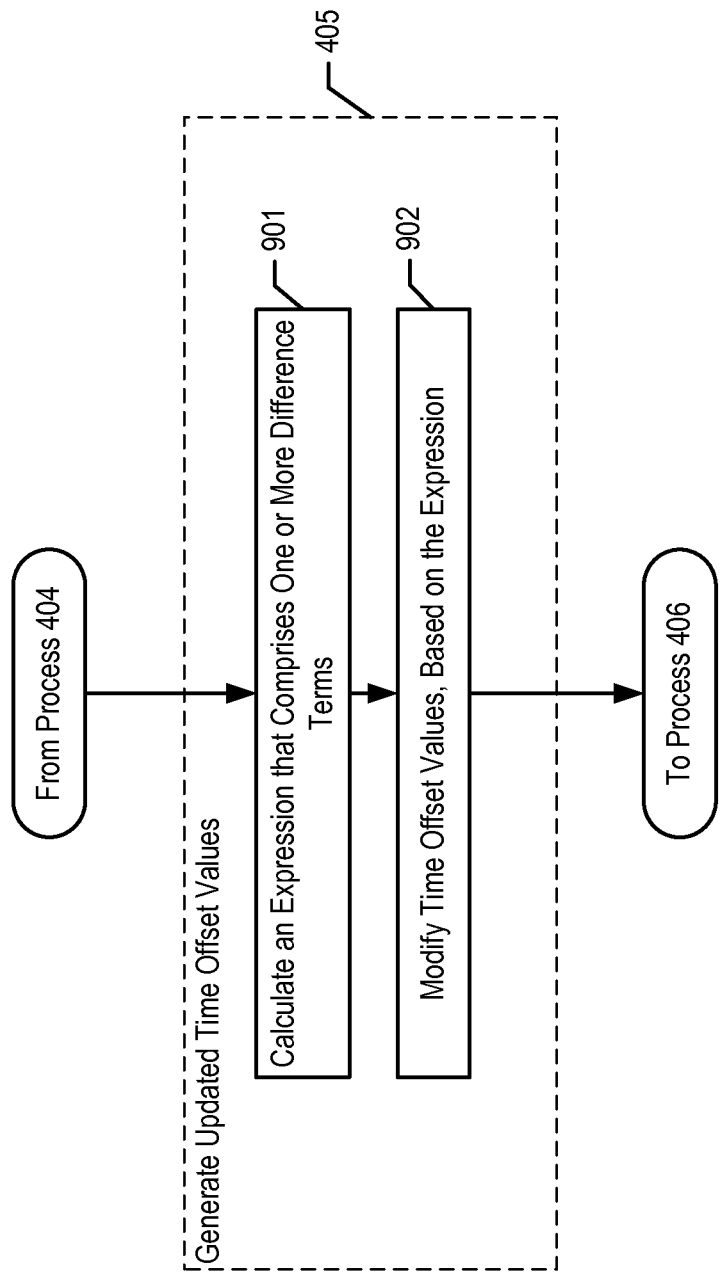
FIG. 9 depicts a flowchart of the salient processes performed in order to generate updated values for one or more time offsets of base stations 201-1 through 201-3.

Generate Updated Time Offset Values—FIG. 9 depicts a flowchart of the salient processes performed in accordance with process 405—generating updated values for one or more time offsets of base stations 201-1 through 201-3.

In accordance with process 901, attribute server 214 calculates the value of an optimization function that comprises one or more expressions. In accordance with the illustrative embodiment these expressions are residuals, as are known in the art. Because the values that are initially chosen for the time offsets of base stations 201-1 through 201-3 are imperfect, the predicted coordinates of the location of wireless terminal 202 will not, in general, be correct after a single iteration and, therefore, may be substantially different from the $(\hat{x}_M, \hat{y}_M)$ reference coordinate pairs returned by location engine 213. The differences are the "residuals".

Attribute server 214 calculates the sum of the squares of the residuals, for the purpose of implementing a "least-squares optimization," as is well known in the art. Server 214 calculates the sum as:

$$S = \sum_{M=1}^{N_S} [(\tilde{x}_M - \hat{x}_M)^2 + (\tilde{y}_M - \hat{y}_M)^2] \quad (4)$$

Although server 214 uses an optimization function in equation (4) that corresponds to a least-squares optimization, it will be clear to those skilled in the art, after reading this specification, how to make and use embodiments of the present invention in which server 214 calculates the value of a different optimization function for the purpose of solving an over-determined system, such as one that is represented by equations comprising the predicted coordinates of wireless terminal 202. For example and without limitation, the optimization function alternatively can be the sum of i) the absolute values of the differences, or ii) the logarithms of the squared differences, or can be a different function entirely.

In accordance with process 902, attribute server 214 modifies the values of the N unknown time offsets of the base stations, $\tau_1, \ldots \tau_N$, so as to reduce the value of S. For example, the values of $\tau_1, \ldots, \tau_N$ can be modified in accordance with the "method of steepest descent," as is known in the art. As those who are skilled in the art will appreciate, after reading this specification, a different method of modifying one or more values of the time offsets can be used other than steepest descent, in some embodiments of the present invention.

In some alternative embodiments of the present invention, the sum of the squares of the residuals, S, is calculated as specified here. In some embodiments of the present invention, location engine 213 is capable of providing an estimate of the error in the reference coordinates of the location of wireless terminal 202. For example, location engine 213 might provide individual estimated standard deviations for each of the $\hat{x}_M$ and $\hat{y}_M$ coordinates. Denoting these standard deviations by $\hat{\sigma}_{xM}$ and $\hat{\sigma}_{yM}$, the optimization function in equation (4) can be modified and used so as to account for these standard deviations, as follows:

$$S = \sum_{M=1}^{N_S} [(\tilde{x}_M - \hat{x}_M)^2 / \hat{\sigma}_{xM}^2 + (\tilde{y}_M - \hat{y}_M)^2 / \hat{\sigma}_{yM}^2]. \quad (5)$$

In addition to the individual estimated standard deviations, $\hat{\sigma}_{xM}$ and $\hat{\sigma}_{yM}$, location engine 213 might also provide correlation coefficients between pairs of $\hat{x}_M$ and $\hat{y}_M$ reference coordinates. It is well known in the art how to apply a unitary matrix to the set of $\hat{x}_M$ and $\hat{y}_M$ coordinates, so as to achieve an equivalent set of reference coordinates that are uncorrelated. The new set of reference coordinates will be associated with a new set of standard deviations whose values can be calculated form the standard deviations and correlation coefficients provided by location engine 213, in well-known fashion. Attribute server 214 can then use the new set of reference coordinates in equation (5), with values of $\tilde{x}_M$ and $\tilde{y}_M$ that have been also processed with a unitary matrix, in order to implement alternative embodiments of the present invention that take into account the correlation coefficients. It will be clear to those skilled in the art, after reading this disclosure, how to make and use embodiments of the present invention that take into account such correlation coefficients by applying a unitary matrix or by other matrix-based algebraic manipulations.

In some other alternative embodiments of the present invention, the least-squares technique can also be used wherein one or more, possibly all, of the $N_S$ signals are received by fewer than three base stations. To illustrate such embodiments, it is useful to examine the expression for the estimate of the propagation delay of a received signal in terms of the reference coordinates of the wireless terminal that transmits the signal and the coordinates of the base station that receives the signal. This expression is the same as one of the three equations in equation set (1):

$$\hat{d}_{iM} = \sqrt{(\hat{x}_M - x_i)^2 + (\hat{y}_M - y_i)^2}/c \quad (6)$$

wherein M=1, ..., $N_S$, and i is in the range 1, ..., N, but a received signal is only available for some values of i, possibly just one. If location engine 213 provides values for the standard deviations of $\hat{x}_M$ and $\hat{y}_M$ and for their pairwise correlation coefficients, it is possible to use (6) to calculate standard deviations and pairwise correlation coefficients for the estimates of the propagation delays, $\hat{d}_{iM}$. Then, it is possible to solve equations (6) and (2) for the propagation delays, based on observed times of occurrences $t_{iM}$. The solved-for values are denoted by $\tilde{d}_{iM}$; and a sum of squares of residuals, S, can now be calculated based on the estimated and solved-for propagation delays, as follows:

$$S = \sum_{M=1}^{N_S} \sum_i (\tilde{d}_{iM} - \hat{d}_{iM})^2 / \hat{\sigma}_{diM}^2 \quad (7)$$

wherein $\hat{\sigma}_{diM}$ denotes the standard deviation of $\hat{d}_{iM}$, and the second summation is performed over all the values of i for which base station 201-i has received the signal transmitted by wireless terminal 202.

When calculating standard deviations and pairwise correlation coefficients for the $\hat{d}_{iM}$ estimates, it may turn out that some of pairs of estimates are correlated; that is, the correlation coefficients between those pairs are non-zero. As noted before, it is well known in the art how to apply a unitary matrix to the set of $\hat{d}_{iM}$ estimates, so as to achieve an equivalent set of estimates that are uncorrelated. The new set of estimates can then be used in equation (7), with values of $\tilde{d}_{iM}$ that have been also processed with a unitary matrix. It will be clear to those skilled in the art, after reading this disclosure, how to make and use embodiments of the present invention that implement a least-squares technique based on a sum of squares of residuals of propagation delays as illustrated in equation (7).

Referring now to the illustrative embodiment, after process 902 attribute server 214 checks for convergence in accordance with process 406. Convergence occurs when the value of S achieves a desired level of accuracy, wherein the level of accuracy required can be determined in well-known fashion.

Figure 11:
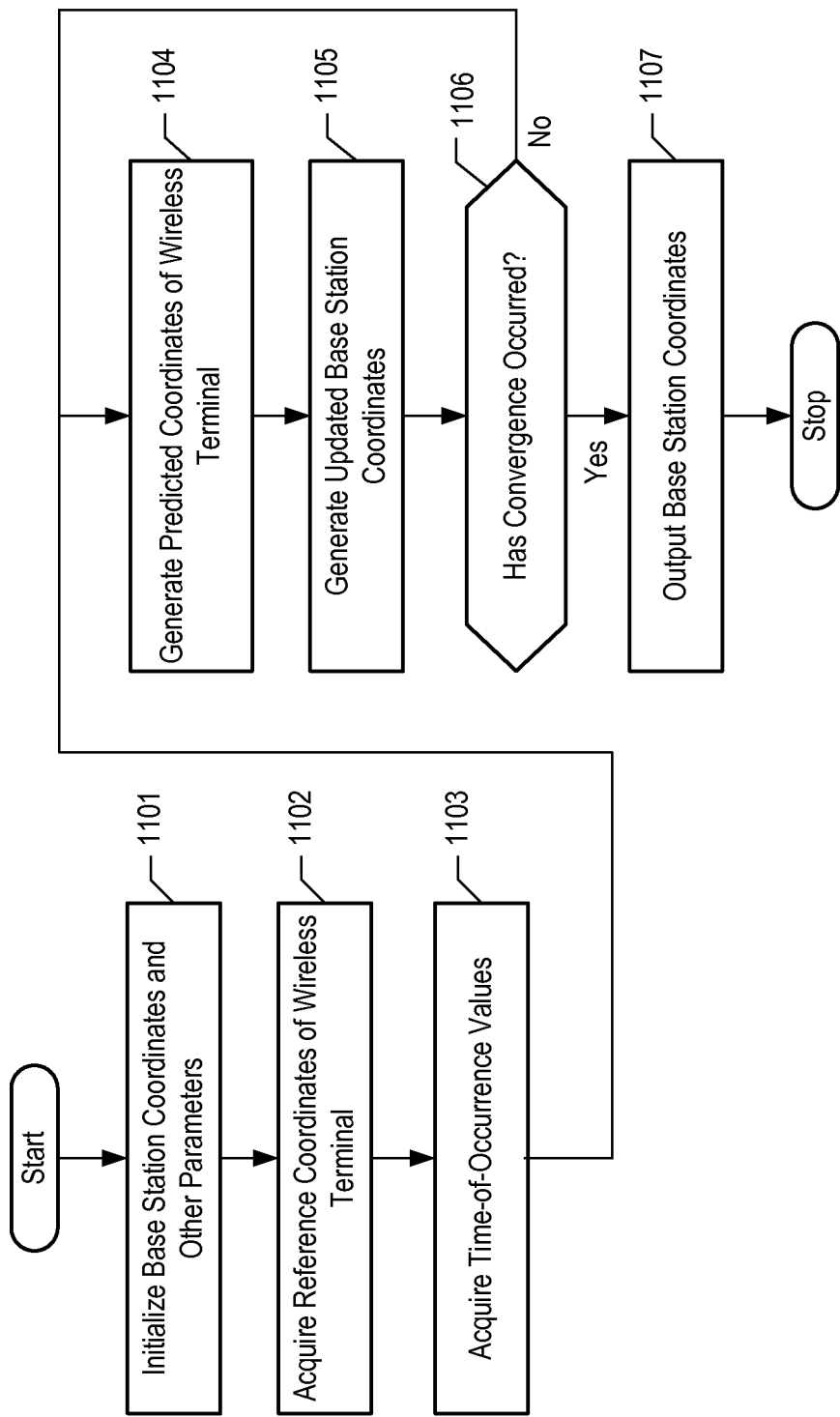
FIG. 11 depicts a flowchart of the salient processes performed in accordance with the illustrative embodiment of the present invention, for calculating estimated coordinates of one or more base stations.

Operation of the Illustrative Embodiment—Calculation of Base Station Coordinates. FIG. 11 depicts a flowchart of the salient processes performed in accordance with the illustrative embodiment of the present invention, in order to calculate estimated coordinates of one or more of base stations 201-1 through 201-3.

In the description above and with respect to FIGS. 4 through 10, the locations of base stations 201-1 through 201-3 have been treated as known. That is, the Cartesian coordinate pairs $(x_i, y_i)$ of the locations of the base stations have been used in the preceding formulas and processed as parameters whose values are known. This is not always true in practice. For example, there might be errors in the network database of base-station locations; there might be base stations that have been moved without the knowledge of the network operator; and there might be base stations that have been successfully installed but, because of procedural errors, their locations have not been recorded. Such occurrences become increasingly likely as smaller cells become more and more common in wireless telecommunications systems, such as system 200. Situations may, in fact, exist within geographic region 220 in which synchronization across some or all of base stations 201-1, 201-2, and 201-3 is not necessary, but it is desirable to obtain an estimate of the location of at least some of the base stations.

In accordance with the illustrative embodiment of the present invention, attribute server 214 performs the processes depicted in FIG. 11, in order to generate one or more sets of coordinates that correspond to the estimated locations of base stations 201-1 through 201-3. For pedagogical purposes, server 214 is depicted as using one or more signals that are transmitted by wireless terminal 202 and are received by one or more of base stations 201-1 through 201-3. The time of occurrence of an event associated with such a signal transmitted by wireless terminal 202 is based on a measurement made at a receiving base station of the arrival time of the signal, in well-known fashion, wherein the event is the arrival of the signal.

Although server 214 is depicted as using signals transmitted by wireless terminal 202, it will be clear to those skilled in the art, after reading this specification, how to make and use embodiments of the present invention in which server 214 uses one or more signals that are transmitted by one or more of base stations 201-1 through 201-3 and are received by wireless terminal 202. In such embodiments, the time of occurrence of an event associated with such a signal transmitted by one or more base stations is based on a measurement made at the transmitting base station of the transmission time of the signal, in well-known fashion, wherein the event is the transmission of the signal. Furthermore, it will be clear to those skilled in the art, after reading this specification, how to make and use embodiments of the present invention in which server 214 uses a combination of signals transmitted by wireless terminal 202 and by one or more of base stations 201-1 through 201-3.

For purposes of clarity, FIG. 11 only represents a method of generating coordinates representing the estimated locations of the base stations, and not also a method of generating time offset values of the base stations. It will be clear, however, to those skilled in the art, after reading this specification, how to make and use embodiments of the present invention in which server 214 generates both i) values for time offsets of the base stations, in accordance with the processes described in FIG. 4, and ii) coordinates of the estimated locations of the base stations, in accordance with the processes described in FIG. 11.

In accordance with process 1101, attribute server 214 initializes estimated base station coordinates and other parameters. The details of initializing the parameters similar to those described in FIG. 5. In accordance with the illustrative embodiment, server 214 uses the received, estimated coordinates of the base stations as the initial values that are subject to modification. In some alternative embodiments of the present invention, a different technique is used to establish the initial values of the estimated base station coordinates.

In accordance with process 1102, attribute server 214 acquires reference coordinates of wireless terminal 202. The details of acquiring the reference coordinates are described in FIG. 6.

In accordance with process 1103, attribute server 214 acquires values for one or more time-of-occurrences of events that are associated with signals that travel between wireless terminal 202 and one or more of base stations 201-1 through 202-3. The details of acquiring the time-of-occurrence values are described in FIG. 7.

In accordance with process 1104, attribute server 214 generates predicted coordinates of wireless terminal 202. The details of generating the predicted coordinates are described in FIG. 8.

In accordance with process 1105, attribute server 214 generates updated coordinates for the estimated locations of base stations 201-1 through 201-3, resulting in $x_{j,Bi}$ and $y_{j,Bi}$ at iteration j for base station 201-i. The details of generating the updated values are described in FIG. 9, with the following differences. Instead of modifying the time offsets of the base stations, server 214 modifies the estimated coordinates of the base stations at the previous iteration, $x_{(j-1),Bi}$ and $y_{(j-1),Bi}$, so as to optimize the optimization function being used.

In accordance with process 1106, attribute server 214 determines whether the updated, estimated base station coordinates have converged. If convergence has not occurred, server 214 repeats the aforementioned processes starting with process 1104. If convergence has occurred, server 214 proceeds to process 1107.

In accordance with process 1107, attribute server 214 outputs the estimated base station coordinates, to be used in an application such as, and without limitation, an application to correct one or more of the base station coordinates in a database. Attribute server 214 transmits the estimate to the particular application.

In accordance with the illustrative embodiment of the present invention, some or all of processes 1101 through 1107 are repeatable, in order to consider different base stations, or different wireless terminals, or different locations of one or more wireless terminals, alone or in any combination.

In some alternative embodiments of the present invention, events occur at different wireless terminals, and/or at different times in the same wireless terminal. For example, this might happen in embodiments where the attribute server uses signals that are transmitted by one or more base station and received by one or more wireless terminals, or in embodiment where the attribute server uses signals that are transmitted by one wireless terminal at different times. In such embodiments, it is advantageous to use a different form of equation set (2):

$$\begin{cases} t_{1M} = (t_{0M1} - \tau_{M0}) + d_{1M} + \tau_1 \\ t_{2M} = (t_{0M2} - \tau_{M1}) + d_{2M} + \tau_2 \\ t_{3M} = (t_{0M3} - \tau_{M3}) + d_{3M} + \tau_3 \end{cases} \quad 8)$$

In this equation set, instead of using the single variable $t_{0M}$, different variables are used to denote the different times of occurrence of different events at the wireless terminals. In particular, $t_{0M1}$, $t_{0M2}$, and $t_{0M3}$, denote the times of occurrence of three different events at three wireless terminal. For example, the different events might be the receptions of signals transmitted by one or more base stations. The times of occurrence are with respect to the terminals' own local clocks, and $\tau_{M0}$, $\tau_{M2}$, $\tau_{M3}$ denote the time offsets between the terminals' local clocks and absolute time. If two or more events occur at the same terminal, the offsets for those events will be the same variable.

In such alternative embodiments, some of the new time offset variables, $\tau_{M0}$, $\tau_{M2}$, $\tau_{M3}$, might cancel out in the mathematical manipulations. For example, if all three events represented by equation set (8) occur at the same wireless terminal, there three new time offset variables are the same variable, and that variable cancels out for the same reason why $t_{0M}$ cancels out in equation set (2). The time offset variables that do not cancel out should be included in the set of time offsets for which values are calculated in the flowchart of FIG. 4. It will be clear to those skilled in the art, after reading this specification, when equation set (8) should be used instead of equation set (2); it will also be clear which time offset variables cancel out and which need to be calculated through the flowchart of FIG. 4.

Although the illustrative embodiment calculates values for time offsets in accordance with the flowchart of FIG. 4, or for base station coordinates in accordance with the flowchart of FIG. 11, there are other attributes of a wireless system or wireless terminals that affect the timing of events. For example, and without limitation, the timing of received or transmitted signals is also affected by the group delay of RF filters used in the radio transmitters and receivers, by the digital processing time in the radio circuits, and by the length of cables that feed base station antennas. It will be clear to those skilled in the art, after reading this specification, how to make and use embodiments of this invention wherein attributes other than time offsets and base station coordinates are calculated, alone or in combination with other attributes.

Although the illustrative embodiment uses residuals based on solved-for values of coordinates, $\tilde{x}_M$ and $\tilde{y}_M$, or solved-for values of delays, $\tilde{d}_{iM}$, it will be clear to those skilled in the art, after reading this specification, how to make and use embodiments of this invention wherein other quantities are solved for and used to calculate residuals.

The relationship between two independent clocks has been described as being characterized by a time offset between the two clocks. This characterization is sufficient in most cases, where the two clocks run at or nearly at the same speed. In situations where the clocks run at different speeds, their relationship can be characterized by an offset (applicable at a specific time epoch) and a relative drift. Other characterizations are also possible. It will be clear to those skilled in the art, after reading this specification, how to make and use embodiments of the present invention wherein relative drift between clocks is one of the attributes for which the attribute server generates values. The attribute server can also generate values for other attributes associated with other characterizations in a manner that will be clear to those skilled in the art, after reading this specification.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
  receiving, by a data processing system:
    (1) a first reference coordinate, $\hat{x}_1$, that represents a reference location of a wireless terminal, and
    (2) a time of occurrence of an event associated with a signal traveling between the wireless terminal and a first base station;
  generating, by the data processing system, a first predicted coordinate, $\tilde{x}_1$, that represents a predicted location of the wireless terminal, based on:
    (1) the location of the first base station,
    (2) the time of occurrence, and
    (3) a first value of a time offset at the first base station, $\tau_{11}$, wherein the time offset characterizes a relationship between i) a local clock of the first base station and ii) an absolute time reference; and
  generating, by the data processing system, a second value of the time offset, $\tau_{21}$, based on modifying first value $\tau_{11}$ dependent upon a function that is defined at least in part by a first expression that comprises $\hat{x}_1$ and $\tilde{x}_1$.
2. The method of claim 1 further comprising:
  receiving a second reference coordinate, $\hat{y}_1$, wherein $\hat{x}_1$ and $\hat{y}_1$ together represent the reference location of the wireless terminal; and
  generating a second predicted coordinate, $\tilde{y}_1$, wherein $\tilde{x}_1$ and $\tilde{y}_1$ together represent the predicted location of the wireless terminal;
  wherein the function is further defined by one or more additional expressions that comprise a residual that is based on $\hat{y}_1$ and $\tilde{y}_1$.
3. The method of claim 1 wherein the first reference coordinate, $\hat{x}_1$, is determined independently of any timing-related trait of any signal traveling between the wireless terminal and the first base station.
4. The method of claim 1 wherein the generating of second value $\tau_{21}$ is based on a method of least squares, wherein the first expression comprises a square of a first residual that is based on $\hat{x}_1$ and $\tilde{x}_1$, and wherein the function is further defined by one or more additional expressions that comprise additional residuals.
5. The method of claim 1 wherein the time of occurrence of the event is the arrival time of the signal at the first base station, wherein the wireless terminal transmits the signal.
6. The method of claim 1 wherein the time of occurrence of the event is the transmission time of the signal at the base station, wherein the first base station transmits the signal.
7. A method comprising:
  receiving, by a data processing system:
    (1) a first reference coordinate, $\hat{x}_1$, that represents a reference location of a wireless terminal,
    (2) a first time of occurrence of a first event associated with a signal traveling between the wireless terminal and a first base station, and
    (3) a second time of occurrence of a second event associated with a signal traveling between the wireless terminal and a second base station;

generating, by the data processing system, a first predicted coordinate, $\tilde{x}_1$, that represents a first predicted location of the wireless terminal, based on:
(1) the location of the first base station,
(2) the location of the second base station,
(3) the first time of occurrence,
(4) the second time of occurrence,
(5) a first value of a first time offset at the first base station, $\tau_{11}$, wherein the first time offset characterizes a relationship between i) a local clock of the first base station and ii) an absolute time reference, and
(6) a first value of a second time offset at the second base station, $\tau_{12}$, wherein the second time offset characterizes timing at the second base station; and
generating, by the data processing system, a second value of the first time offset, $\tau_{21}$, and a second value of the second time offset, $\tau_{22}$, based on modifying first values $\tau_{11}$ and $\tau_{12}$ dependent upon a function that is defined at least in part by a first expression that comprises $\hat{x}_1$ and $\tilde{x}_1$.

8. The method of claim 7 further comprising:
receiving a second reference coordinate, $\hat{y}_1$, wherein $\hat{x}_1$ and $\hat{y}_1$ together represent the reference location of the wireless terminal; and
generating a second predicted coordinate, $\tilde{y}_1$, wherein $\tilde{x}_1$ and $\tilde{y}_1$ together represent the predicted location of the wireless terminal;
wherein the function is further defined by one or more additional expressions that comprise a residual that is based on $\hat{y}_1$ and $\tilde{y}_1$.

9. The method of claim 7 wherein the first reference coordinate, $\hat{x}_1$, is determined independently of any timing-related trait of any signal traveling between the wireless terminal and the first base station.

10. The method of claim 7 wherein the generating of second values $\tau_{21}$ and $\tau_{22}$ is based on a method of least squares, wherein the first expression comprises a square of a first residual that is based on $\hat{x}_1$ and $\tilde{x}_1$, and wherein the function is further defined by one or more additional expressions that comprise additional residuals.

11. The method of claim 7 wherein the first time of occurrence of the first event is the arrival time of the signal at the first base station, wherein the wireless terminal transmits the signal.

12. The method of claim 7 wherein the first time of occurrence of the first event is the transmission time of the signal at the first base station, wherein the first base station transmits the signal.

13. A method comprising:
receiving, by a data processing system:
(1) a first reference coordinate, $\hat{x}_1$, that represents a first reference location of a wireless terminal,
(2) a second reference coordinate, $\hat{x}_2$, that represents a second reference location of the wireless terminal,
(3) a first time of occurrence of a first event associated with a signal traveling between (i) the wireless terminal at the first reference location and (ii) a first base station, and
(4) a second time of occurrence of a second event associated with a signal traveling between (i) the wireless terminal at the second reference location and (ii) the first base station;
generating, by the data processing system, a first predicted coordinate, $\tilde{x}_1$, that represents a first predicted location of the wireless terminal, based on:
(1) the location of the first base station,
(2) the first time of occurrence, and
(3) a first value of a time offset at the first base station, $\tau_{11}$, wherein the time offset characterizes a relationship between i) a local clock of the first base station and ii) an absolute time reference;
generating, by the data processing system, a second predicted coordinate, $\tilde{x}_2$, that represents a second predicted location of the wireless terminal, based on:
(1) the location of the first base station,
(2) the second time of occurrence, and
(3) the first value of the time offset at the first base station, $\tau_{11}$; and
generating, by the data processing system, a second value of the time offset at the first base station, $\tau_{21}$, based on modifying $\tau_{11}$ dependent upon a function that is defined at least in part by:
(1) a first expression that comprises $\hat{x}_1$ and $\tilde{x}_1$, and
(2) a second expression that comprises $\hat{x}_2$ and $\tilde{x}_2$.

14. The method of claim 13 further comprising:
receiving, by the data processing system, a third time of occurrence of a third event associated with a signal traveling between (i) the wireless terminal at the first reference location and (ii) a second base station, wherein the generating of the first predicted coordinate, $\tilde{x}_1$, is also based on:
(1) the location of the second base station,
(2) the third time of occurrence, and
(3) a first value of a second time offset at the second base station, $\tau_{12}$, wherein the second time offset characterizes timing at the second base station; and
generating, by the data processing system, a second value of the second time offset, $\tau_{22}$, based on modifying first values $\tau_{11}$ and $\tau_{12}$ dependent upon the function.

15. The method of claim 13 wherein the first reference coordinate, $\hat{x}_1$, is determined independently of any timing-related trait of any signal traveling between the wireless terminal and the first base station.

16. The method of claim 13 wherein the generating of the second value of the time offset is based on a method of least squares, wherein the first expression comprises a square of a first residual that is based on $\hat{x}_1$ and $\tilde{x}_1$, and wherein the function is further defined by one or more additional expressions that comprise additional residuals.

17. The method of claim 13 wherein the first time of occurrence of the first event is the arrival time of the signal at the first base station, wherein the wireless terminal transmits the signal.

18. The method of claim 13 wherein the first time of occurrence of the first event is the transmission time of the signal at the first base station, wherein the first base station transmits the signal.

19. A method comprising:
receiving, by a data processing system:
(1) a first reference coordinate of a first wireless terminal, $\hat{x}_{11}$, that represents a first reference location of the first wireless terminal,
(2) a first reference coordinate of a second wireless terminal, $\hat{x}_{12}$, that represents a second reference location of the second wireless terminal,
(3) a first time of occurrence of a first event associated with a signal traveling between (i) the first wireless terminal and (ii) a first base station, and
(4) a second time of occurrence of a second event associated with a signal traveling between (i) the second wireless terminal and (ii) the first base station;

generating, by the data processing system, a first predicted coordinate of the first wireless terminal, $\tilde{x}_{11}$, that represents a first predicted location of the first wireless terminal, based on:
  (1) the location of the first base station,
  (2) the first time of occurrence, and
  (3) a first value of a time offset at the first base station, $\tau_{11}$, wherein the time offset characterizes a relationship between i) a local clock of the first base station and ii) an absolute time reference;

generating, by the data processing system, a first predicted coordinate of the second wireless terminal, $\tilde{x}_{12}$, that represents a second predicted location of the second wireless terminal, based on:
  (1) the location of the first base station,
  (2) the second time of occurrence, and
  (3) the first value of the time offset at the first base station, $\tau_{11}$; and generating, by the data processing system, a second value of the time offset at the first base station, $\tau_{21}$, based on modifying $\tau_{11}$ dependent upon a function that is defined at least in part by:
  (1) a first expression that comprises $\hat{x}_{11}$ and $\tilde{x}_{11}$, and
  (2) a second expression that comprises $\hat{x}_{12}$ and $\tilde{x}_{12}$.

20. The method of claim 19 further comprising:
receiving, by a data processing system, a third time of occurrence of a third event associated with a signal traveling between (i) the first wireless terminal and (ii) a second base station, wherein the generating of the first predicted coordinate of the first wireless terminal, $\tilde{x}_{11}$, is also based on:
  (1) the location of the second base station,
  (2) the third time of occurrence, and
  (3) a first value of a second time offset at the second base station, $\tau_{12}$, wherein the second time offset characterizes timing at the second base station; and generating, by the data processing system, a second value of the second time offset, $\tau_{22}$, based on modifying first values $\tau_{11}$ and $\tau_{12}$ dependent upon the function.

21. The method of claim 19 further comprising:
receiving, by the data processing system:
  (1) a second reference coordinate of the first wireless terminal, $\hat{x}_{21}$, that represents a third reference location of the first wireless terminal, and
  (2) a third time of occurrence of a third event associated with a signal traveling between (i) the first wireless terminal at the third reference location and (ii) a first base station; and generating, by the data processing system, a second predicted coordinate of the first wireless terminal, $\tilde{x}_{21}$, that represents a third predicted location of the first wireless terminal, based on:
  (1) the location of the first base station,
  (2) the third time of occurrence, and
  (3) the first value of the time offset at the first base station, $\tau_{11}$;
wherein the function is further defined by one or more additional expressions that comprise $\hat{x}_{21}$ and $\tilde{x}_{21}$.

22. The method of claim 19 wherein the first reference coordinate of the first wireless terminal, $\hat{x}_{11}$, is determined independently of any timing-related trait of any signal traveling between the first wireless terminal and the first base station.

23. The method of claim 19 wherein the generating of the second value of the time offset is based on a method of least squares, wherein the first expression comprises a square of a first residual that is based on $\hat{x}_1$ and $\tilde{x}_{11}$, and wherein the function is further defined by one or more additional expressions that comprise additional residuals.

24. The method of claim 19 wherein the first time of occurrence of the first event is the arrival time of the signal at the first base station, wherein the first wireless terminal transmits the signal.

25. The method of claim 19 wherein the first time of occurrence of the first event is the transmission time of the signal at the first base station, wherein the first base station transmits the signal.

26. An apparatus comprising:
a receiver for receiving:
  (I) a first reference coordinate, $\hat{x}_1$, that represents a reference location of a wireless terminal, and
  (II) a time of occurrence of an event associated with a signal traveling between the wireless terminal and a first base station; and
a processor for generating:
  (I) a first predicted coordinate, $\tilde{x}_1$, that represents a predicted location of the wireless terminal, based on:
    (1) the location of the first base station,
    (2) the time of occurrence, and
    (3) a first value of a time offset at the first base station, $\tau_{11}$, wherein the time offset characterizes a relationship between i) a local clock of the first base station and ii) an absolute time reference, and
  (II) a second value of the time offset, $\tau_{21}$, based on modifying first value $\tau_{11}$ dependent upon a function that is defined at least in part by a first expression that comprises $\hat{x}_1$ and $\tilde{x}_1$.

27. The apparatus of claim 26 wherein the receiver is also for receiving (III) a second reference coordinate, $\hat{y}_1$, wherein $\hat{x}_1$ and $\hat{y}_1$ together represent the reference location of the wireless terminal; and
wherein the processor is also for generating (III) a second predicted coordinate, $\tilde{y}_1$, wherein $\tilde{x}_1$ and $\tilde{y}_1$ together represent the predicted location of the wireless terminal; and
wherein the function is further defined by one or more additional expressions that comprise a residual that is based on $\hat{y}_1$ and $\tilde{y}_1$.

28. The apparatus of claim 26 wherein the first reference coordinate, $\hat{x}_1$, is determined independently of any timing-related trait of any signal traveling between the wireless terminal and the first base station.

29. The apparatus of claim 26 wherein the generating of second value $\tau_{21}$ is based on a method of least squares, wherein the first expression comprises a square of a first residual that is based on $\hat{x}_1$ and $\tilde{x}_1$, and wherein the function is further defined by one or more additional expressions that comprise additional residuals.

30. The apparatus of claim 26 wherein the time of occurrence of the event is the arrival time of the signal at the first base station, wherein the wireless terminal transmits the signal.

31. The apparatus of claim 26 wherein the time of occurrence of the event is the transmission time of the signal at the base station, wherein the first base station transmits the signal.

32. An apparatus comprising:
a receiver for receiving:
  (I) a first reference coordinate, $\hat{x}_1$, that represents a reference location of a wireless terminal,
  (II) a first time of occurrence of a first event associated with a signal traveling between the wireless terminal and a first base station, and (III) a second time of occurrence of a second event associated with a signal traveling between the wireless terminal and a second base station; and a processor for generating:
(I) a first predicted coordinate, $\tilde{x}_1$, that represents a first predicted location of the wireless terminal, based on:
  (1) the location of the first base station,
  (2) the location of the second base station,
  (3) the first time of occurrence,
  (4) the second time of occurrence,
  (5) a first value of a first time offset at the first base station, $\tau_{11}$, wherein the first time offset characterizes a relationship between i) a local clock of the first base station and ii) an absolute time reference, and
  (6) a first value of a second time offset at the second base station, $\tau_{12}$, wherein the second time offset characterizes timing at the second base station, and
(II) a second value of the first time offset, $\tau_{21}$, and a second value of the second time offset, $\tau_{22}$, based on modifying first values $\tau_{11}$ and $\tau_{12}$ dependent upon a function that is defined at least in part by a first expression that comprises $\hat{x}_1$ and $\tilde{x}_1$.

33. The apparatus of claim 32 wherein the receiver is also for receiving (IV) a second reference coordinate, $\hat{y}_1$, wherein $\hat{x}_1$ and $\hat{y}_1$ together represent the reference location of the wireless terminal; and
wherein the processor is also for generating (III) a second predicted coordinate, $\tilde{y}_1$, wherein $\tilde{x}_1$ and $\tilde{y}_1$ together represent the predicted location of the wireless terminal; and
wherein the function is further defined by one or more additional expressions that comprise a residual that is based on $\hat{y}_1$ and $\tilde{y}_1$.

34. The apparatus of claim 32 wherein the first reference coordinate, $\hat{x}_1$, is determined independently of any timing-related trait of any signal traveling between the wireless terminal and the first base station.

35. The apparatus of claim 32 wherein the generating of second values $\tau_{21}$ and $\tau_{22}$ is based on a method of least squares, wherein the first expression comprises a square of a first residual that is based on $\hat{x}_1$ and $\tilde{x}_1$, and wherein the function is further defined by one or more additional expressions that comprise additional residuals.

36. The apparatus of claim 32 wherein the first time of occurrence of the first event is the arrival time of the signal at the first base station, wherein the wireless terminal transmits the signal.

37. The apparatus of claim 32 wherein the first time of occurrence of the first event is the transmission time of the signal at the first base station, wherein the first base station transmits the signal.

38. An apparatus comprising:
a receiver for receiving:
(I) a first reference coordinate, $\hat{x}_1$, that represents a first reference location of a wireless terminal,
(II) a second reference coordinate, $\hat{x}_2$, that represents a second reference location of the wireless terminal,
(III) a first time of occurrence of a first event associated with a signal traveling between (i) the wireless terminal at the first reference location and (ii) a first base station, and
(IV) a second time of occurrence of a second event associated with a signal traveling between (i) the wireless terminal at the second reference location and (ii) the first base station; and a processor for generating:
(I) a first predicted coordinate, $\tilde{x}_1$, that represents a first predicted location of the wireless terminal, based on:
  (1) the location of the first base station,
  (2) the first time of occurrence, and
  (3) a first value of a time offset at the first base station, $\tau_{11}$, wherein the time offset characterizes a relationship between i) a local clock of the first base station and ii) an absolute time reference, and
(II) a second predicted coordinate, $\tilde{x}_2$, that represents a second predicted location of the wireless terminal, based on:
  (1) the location of the first base station,
  (2) the second time of occurrence, and
  (3) the first value of the time offset at the first base station, $\tau_{11}$, and
(III) a second value of the time offset at the first base station, $\tau_{21}$, based on modifying $\tau_{11}$ dependent upon a function that is defined at least in part by:
  (1) a first expression that comprises $\hat{x}_1$ and $\tilde{x}_1$, and
  (2) a second expression that comprises $\hat{x}_2$ and $\tilde{x}_2$.

39. The apparatus of claim 38 wherein the receiver is also for receiving (V) a third time of occurrence of a third event associated with a signal traveling between (i) the wireless terminal at the first reference location and (ii) a second base station;
wherein the generating of the first predicted coordinate, $\tilde{x}_1$, is also based on:
  (1) the location of the second base station,
  (2) the third time of occurrence, and
  (3) a first value of a second time offset at the second base station, $\tau_{12}$, wherein the second time offset characterizes timing at the second base station; and
wherein the processor is also for generating (IV) a second value of the second time offset, $\tau_{22}$, based on modifying first values $\tau_{11}$ and $\tau_{12}$ dependent upon the function.

40. The apparatus of claim 38 wherein the first reference coordinate, $\hat{x}_1$, is determined independently of any timing-related trait of any signal traveling between the wireless terminal and the first base station.

41. The apparatus of claim 38 wherein the generating of the second value of the time offset is based on a method of least squares, wherein the first expression comprises a square of a first residual that is based on $\hat{x}_1$ and $\tilde{x}_1$, and wherein the function is further defined by one or more additional expressions that comprise additional residuals.

42. The apparatus of claim 38 wherein the first time of occurrence of the first event is the arrival time of the signal at the first base station, wherein the wireless terminal transmits the signal.

43. The apparatus of claim 38 wherein the first time of occurrence of the first event is the transmission time of the signal at the first base station, wherein the first base station transmits the signal.

44. An apparatus comprising:
a receiver for receiving:
(I) a first reference coordinate of a first wireless terminal, $\hat{x}_{11}$, that represents a first reference location of the first wireless terminal,
(II) a first reference coordinate of a second wireless terminal, $\hat{x}_{12}$, that represents a second reference location of the second wireless terminal,
(III) a first time of occurrence of a first event associated with a signal traveling between (i) the first wireless terminal and (ii) a first base station, and (IV) a second time of occurrence of a second event associated with a signal traveling between (i) the second wireless terminal and (ii) the first base station; and a processor for generating:
(I) a first predicted coordinate of the first wireless terminal, $\tilde{x}_{11}$, that represents a first predicted location of the first wireless terminal, based on:
(1) the location of the first base station,
(2) the first time of occurrence, and
(3) a first value of a time offset at the first base station, $\tau_{11}$, wherein the time offset characterizes a relationship between i) a local clock of the first base station and ii) an absolute time reference, and
(II) a first predicted coordinate of the second wireless terminal, $\tilde{x}_{12}$, that represents a second predicted location of the second wireless terminal, based on:
(1) the location of the first base station,
(2) the second time of occurrence, and
(3) the first value of the time offset at the first base station, $\tau_{11}$, and
(III) a second value of the time offset at the first base station, $\tau_{21}$, based on modifying $\tau_{11}$ dependent upon a function that is defined at least in part by:
(1) a first expression that comprises $\hat{x}_{11}$ and $\tilde{x}_{11}$, and
(2) a second expression that comprises $\hat{x}_{12}$ and $\tilde{x}_{12}$.

45. The apparatus of claim 44 wherein the receiver is also for receiving (V) a third time of occurrence of a third event associated with a signal traveling between (i) the first wireless terminal and (ii) a second base station;
wherein the generating of the first predicted coordinate of the first wireless terminal, $\tilde{x}_{11}$, is also based on:
(1) the location of the second base station,
(2) the third time of occurrence, and
(3) a first value of a second time offset at the second base station, $\tau_{12}$, wherein the second time offset characterizes timing at the second base station; and
wherein the processor is also for generating (IV) a second value of the second time offset, $\tau_{22}$, based on modifying first values $\tau_{11}$ and $\tau_{12}$ dependent upon the function.

46. The apparatus of claim 44 wherein the receiver is also for receiving:
(V) a second reference coordinate of the first wireless terminal, $\hat{x}_{21}$, that represents a third reference location of the first wireless terminal, and
(VI) a third time of occurrence of a third event associated with a signal traveling between (i) the first wireless terminal at the third reference location and (ii) a first base station; and
wherein the processor is also for generating (IV) a second predicted coordinate of the first wireless terminal, $\tilde{x}_{21}$ that represents a third predicted location of the first wireless terminal, based on:
(1) the location of the first base station,
(2) the third time of occurrence, and
(3) the first value of the time offset at the first base station, $\tau_{11}$; and
wherein the function is further defined by one or more additional expressions that comprise $\hat{x}_{21}$ and $\tilde{x}_{21}$.

47. The apparatus of claim 44 wherein the first reference coordinate of the first wireless terminal, $\hat{x}_{11}$, is determined independently of any timing-related trait of any signal traveling between the first wireless terminal and the first base station.

48. The apparatus of claim 44 wherein the generating of the second value of the time offset is based on a method of least squares, wherein the first expression comprises a square of a first residual that is based on $\hat{x}_{11}$ and $\tilde{x}_{11}$, and wherein the function is further defined by one or more additional expressions that comprise additional residuals.

49. The apparatus of claim 44 wherein the first time of occurrence of the first event is the arrival time of the signal at the first base station, wherein the first wireless terminal transmits the signal.

50. The apparatus of claim 44 wherein the first time of occurrence of the first event is the transmission time of the signal at the first base station, wherein the first base station transmits the signal.

* * * * *